United States Patent [19]

Hata et al.

[11] Patent Number: 4,767,202
[45] Date of Patent: Aug. 30, 1988

[54] OBJECTIVE LENS SYSTEM FOR OPTICAL RECORDING TYPE DISKS

[75] Inventors: Kazuyoshi Hata; Sachiko Takamura, both of Sakai, Japan

[73] Assignee: Minolta Camera Kabushiki Kaisha, Osaka, Japan

[21] Appl. No.: 692,766

[22] Filed: Jan. 18, 1985

[30] Foreign Application Priority Data

Jan. 20, 1984 [JP] Japan .................................. 59-9109
Jan. 23, 1984 [JP] Japan .................................. 59-10728

[51] Int. Cl.⁴ .......................... G02B 13/18; G02B 9/06
[52] U.S. Cl. ...................................... 350/432; 350/480
[58] Field of Search ............................... 350/432–435, 350/480

[56] References Cited

U.S. PATENT DOCUMENTS

| | | | |
|---|---|---|---|
| 4,002,406 | 1/1977 | Sussman | 350/432 |
| 4,525,040 | 6/1985 | Nakamura | 350/432 X |
| 4,595,264 | 6/1986 | Nakamura | 350/432 X |
| 4,645,311 | 2/1987 | Rothe | 350/432 |

FOREIGN PATENT DOCUMENTS 3220408 5/1985 Fed. Rep. of Germany ......... 13/24
59-9619 1/1984 Japan ..................................... 13/18
2121210 5/1982 United Kingdom .................. 13/18

OTHER PUBLICATIONS

Design and Testing of Lenses for Optical Disk Technology by P. Kuttner, Optical Engineering (1983).
Optical Systems for Optical Disk Technology by P. Kuttner, Optical Disk Technology (1982).

Primary Examiner—John K. Corbin
Assistant Examiner—Scott J. Sugarman
Attorney, Agent, or Firm—Price, Gess & Ubell

[57] ABSTRACT

The present invention provides an objective lens system for optical recording type disks, comprising from a light source side to a disk side; a first lens element having a positive refractive power, said first lens element having at least an aspherical surface; a second lens element having a positive refractive power; and wherein the objective lens system fulfills the following condition:

$$-\tfrac{1}{2} < \beta < -\tfrac{1}{8}$$

wherein $\beta$ represents the magnification of the whole lens system.

5 Claims, 29 Drawing Sheets

Spherical Sine
Aberration Condition

Astigmatism

Distortion %

Spherical Sine
Aberration Condition

Astigmatism

Distortion %

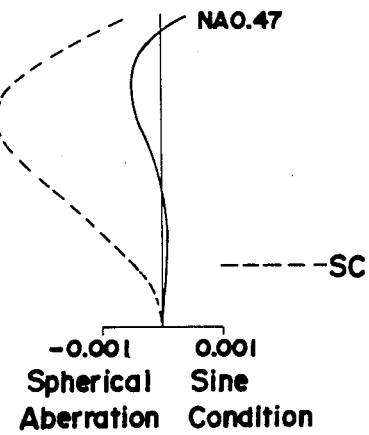
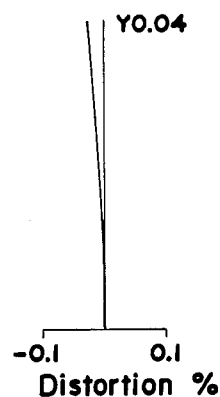
FIG.23A — Spherical Aberration / Sine Condition (NA0.47, SC)
FIG.23B — Astigmatism (Y0.04, DM, DS)
FIG.23C — Distortion % (Y0.04)
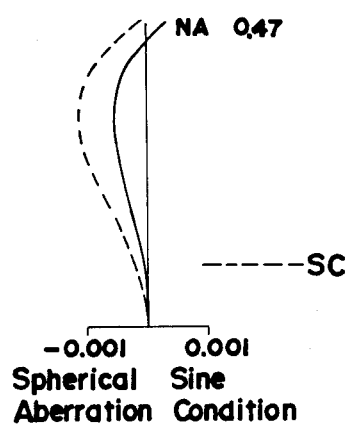
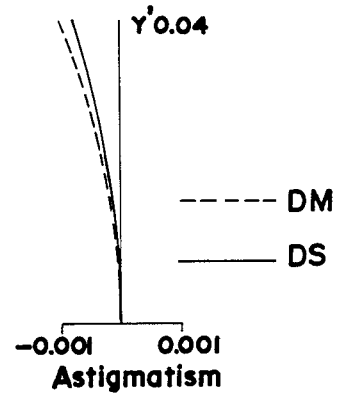
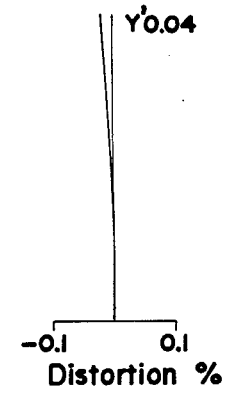
FIG.24A — Spherical Aberration / Sine Condition (NA 0.47, SC)
FIG.24B — Astigmatism (Y'0.04, DM, DS)
FIG.24C — Distortion % (Y'0.04)

FIG.25
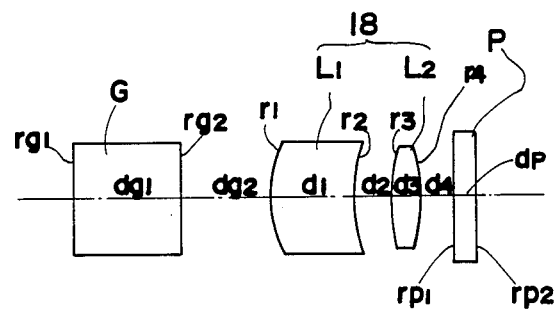
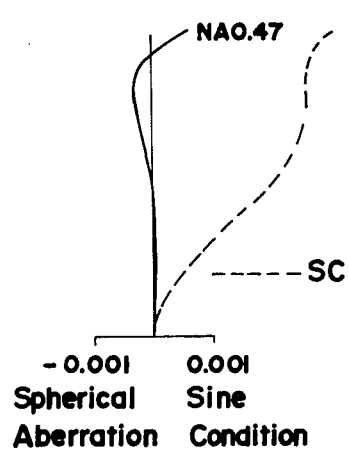
FIG.26A
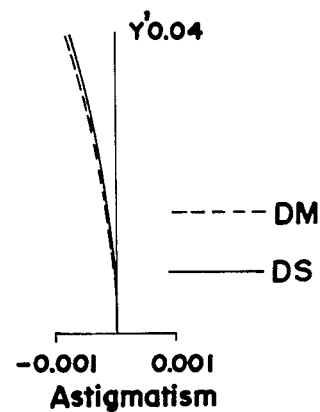
FIG.26B
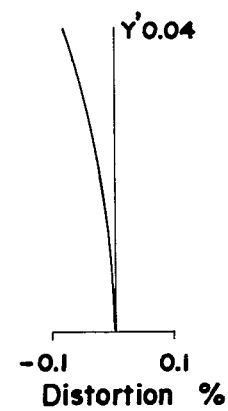
FIG.26C

FIG.27
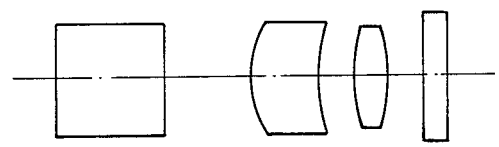
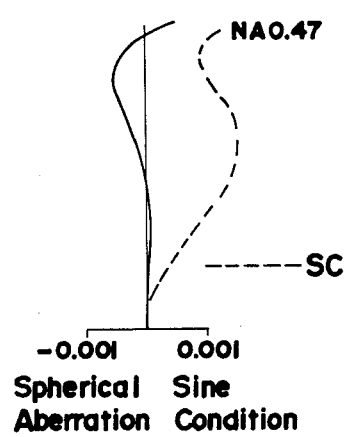
FIG.28A
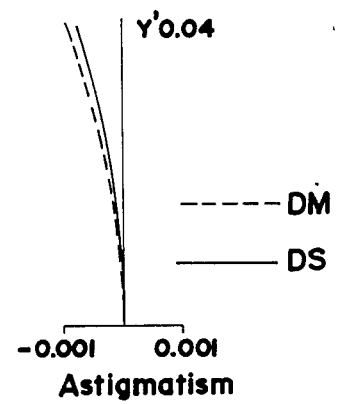
FIG.28B
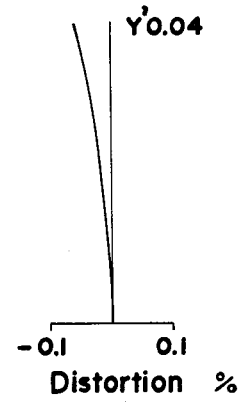
FIG.28C

FIG.29
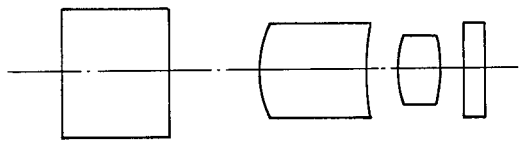
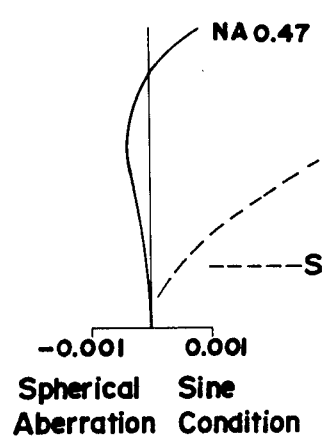
FIG.30A
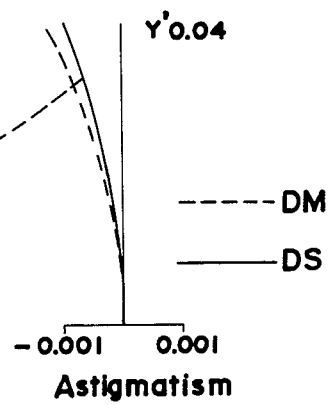
FIG.30B
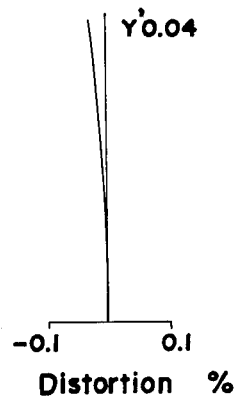
FIG.30C

FIG.31
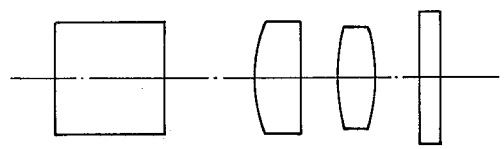
FIG.32A  FIG.32B  FIG.32C
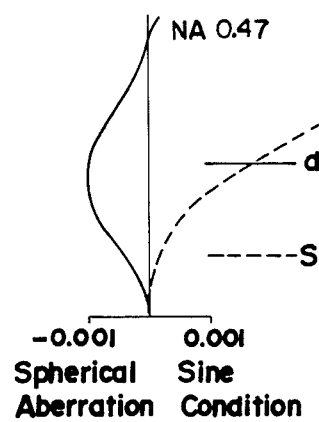
Spherical Sine
Aberration Condition
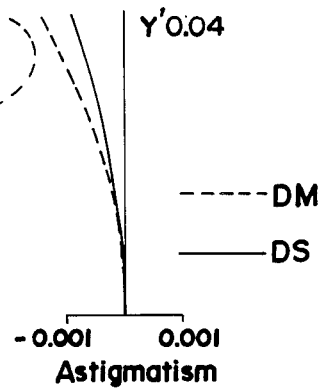
Astigmatism
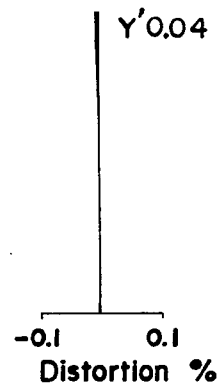
Distortion %

-0.001  0.001
Spherical  Sine
Aberration  Condition

-0.001  0.001
Astigmatism

-0.1  0.1
Distortion %

-0.001  0.001
Spherical Sine
Aberration Condition

-0.001  0.001
Astigmatism

-0.1  0.1
Distortion %

-0.001  0.001
Spherical Sine
Aberration Condition

-0.001  0.001
Astigmatism

-0.1  0.1
Distortion  %

-0.001    0.001
Spherical  Sine
Aberration Condition

-0.001    0.001
Astigmatism

-0.1    0.1
Distortion %

FIG.45
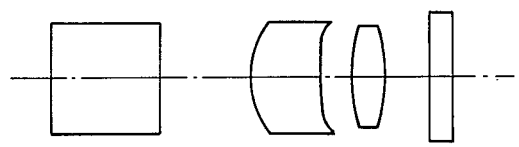
FIG.46A FIG.46B FIG.46C
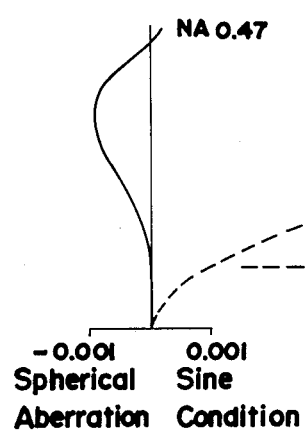
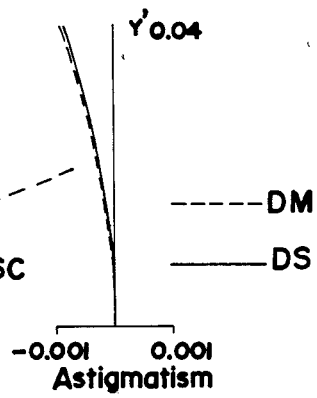
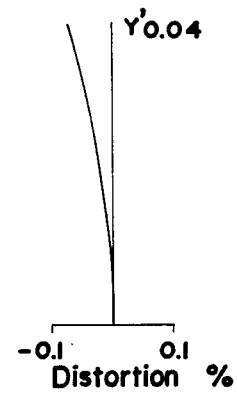

-0.001  0.001
Spherical  Sine
Aberration Condition

-0.001  0.001
Astigmatism

-0.2  0.2
Distortion  %

Spherical Sine
Aberration Condition

Astigmatism

Distortion %

Spherical Sine
Aberration Condition

Astigmatism

Distortion %

-0.001   0.001
Spherical  Sine
Aberration Condition

-0.001   0.001
Astigmatism

-0.1   0.1
Distortion  %

Spherical Sine
Aberration Condition

Astigmatism

Distortion %

-0.001  0.001
Spherical  Sine
Aberration  Condition

-0.001  0.001
Astigmatism

-0.1  0.1
Distortion %

FIG.59
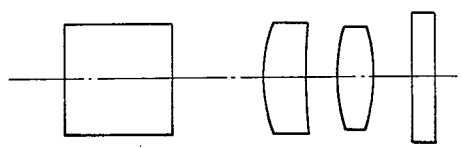
FIG.60A    FIG.60B    FIG.60C
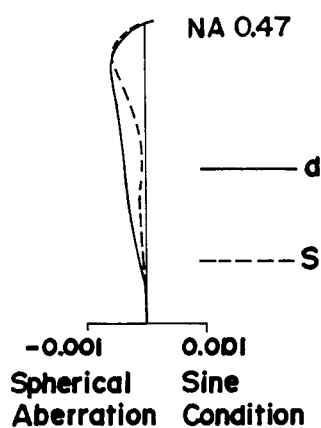
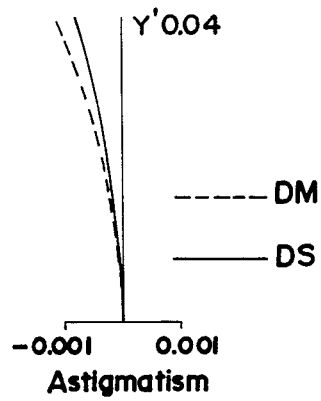
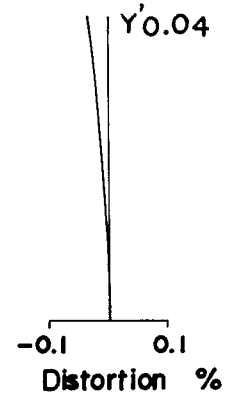

OBJECTIVE LENS SYSTEM FOR OPTICAL RECORDING TYPE DISKS

BACKGROUND OF THE INVENTION

1. Field of the Invention

The present invention relates to an objective lens system for optical recording type disks, such as digitally recorded audio disks, video disks, etc.

2. Description of the Prior Art

In such objective lens system, it is required to correct the aberrations to an extraordinarily high degree and to achieve a high resolving power, in order to form, on the disk, an extreme small spot image whose size is determined in accordance with the limit of the diffraction of light. Thus, a numerical aperture about 0.4~0.5 is necessary in type of lens system.

An objective lens system of this type has been proposed, for example, in Japanese Laid-Open Patent Application No. SHO No. 55-4068. However, a conventional optical recording type disk device is constructed as shown in FIG. 1. In FIG. 1, a light bundle emitted from a laser light source (2) is converted to a parallel light bundle by a collimating lens system (4). The parallel light bundle is incident on a beam splitter (6) from the light source side. The beam splitter (6) has a half mirror for dividing the light incident thereon by reflection and transmission. Thus, the parallel light bundle transmitted through the beam splitter (6) is concentrated into a spot on a rear surface of disk (10) by an objective lens system (8). The reflected light bundle from the disk (10) is incident on the beam splitter (6) from the disk side through the objective lens system (8). One part of such light bundle is reflected on the beam splitter (6) toward a lens system for focus detection (12), and another part thereof is transmitted through the beam splitter (6). The light bundle reflected toward the lens system (12) is incident on a light receiving device (14) through the lens system (12).

The lens system (12) is used for detecting the focusing condition of the objective lens system (8) on the rear surface of the disk (10). This lens system (12) includes a cylindrical lens element (12a) in order to generate a great amount of astigmatism in a predetermined direction perpendicular to the optical axis. The light receiving device includes plurality of light receiving cells which are arranged symmetrically with respect to the optical axis. Thus, the focusing condition of the objective lens system is detected in accordance with the output signals from such light receiving cells. A diffraction grating (16) is arranged so that the tracking condition of the light bundle incident on the disk (10) is detected a well-known three beam method.

FIG. 2 shows another arrangement of the prior art in which the collimating lens system (4) is arranged on the disk side of the beam splitter (6).

In the above arrangement, two methods for tracking of the light bundle incident on the disk (10) are known. One of the methods is to use a galvano mirror which is vibrated for changing the position of the light spot on the disk (10). However, in this method, it is necessary to correct various aberrations of the objective lens system with respect to the off-axial rays, since the light rays incident on the objective lens system would have some inclination angle to its optical axis. Thus, it causes to increase the number of the lens elements in the objective lens system, and to deteriorate the compactness of the objective lens system due to the extension of the focal length thereof.

Therefore, another method is often applied. This method is to shift the objective lens system perpendicularly to its optical axis for tracking of the light bundle. This method has an advantage in that it requires to correct the aberrations of the objective lens system only with respect to the paraxial rays, because the light rays incident on the objective lens system are always parallel to its optical axis. However, in this method, the construction of the objective lens system is required to be light in weight and to be simple, because the objective lens system itself is shifted for tracking.

Furthermore, it should be raised to make a pick-up device for disks more compact. Two methods would be considered for making the optical system in the pick-up device more compact. One of them is to shorten the focal length of the objective lens system for decrease the distance between the laser light source and the disk. However, the radius of curvature of any refractive surface in the objective lens system become small in proportion to the shortening of the focal length of the objective lens system. The sensitivity of the optical performance to a manufacturing error is undesirably increased in proportion to shortening of the focal length of the objective lens system. Thus, this method has a limit in minimizing the focal length of the objective lens system.

Another method is to increase the numerical aperture NA of the collimating lens system. However, this method requires the designer to increase the number of the lens elements in the collimating lens system. Thus, it causes and increase in the cost. Furthermore, in this method, the dispersion of the astigmatic difference in the laser light source becomes another problem.

SUMMARY OF THE INVENTION

An object of the present invention is to provide an objective lens system which is useful for making the pick-up device compact in construction.

Another object of the present invention is to provide an objective lens system which is suitable for tracking by shifting the objective lens system.

According to the present invention, an objective lens system for optical recording type disks, comprising from a light source side to a disk side;

a first lens element having a positive refractive power, said first lens element having at least an aspherical surface;

a second lens element having a positive refractive power; and wherein the objective lens system fulfills the following condition:

$$-\tfrac{1}{2} < \beta < -\tfrac{1}{8}$$

wherein:

$\beta$ represents the magnification of the whole lens system.

BRIEF DESCRIPTION OF THE DRAWINGS

FIGS. 23A to 23C represent the aberration curves of the embodiment 15;

FIGS. 24A to 24C represent the aberration curves of the embodiment 16;

FIG. 25 represents a cross sectional view of the objective lens system according to the embodiment 17 of the present invention;

FIGS. 26A to 26C represent the aberration curves of the embodiment 17;

FIG. 27 represents a cross sectional view of the objective lens system according to the embodiment 18 of the present invention;

FIGS. 28A to 28C represent the aberration curves of the embodiment 18;

FIG. 29 represents a cross sectional view of the objective lens system according to the embodiment 19 of the present invention;

FIGS. 30A to 30C represent the aberration curves of the embodiment 19;

FIG. 31 represents a cross sectional view of the objective lens system according to the embodiment 20 of the present invention;

FIGS. 32A to 32C represent the aberration curves of the embodiment 20;

FIG. 45 represents a cross sectional view of the objective lens system according to the embodiment 27 of the present invention;

FIGS. 46A to 46C represent the aberration curves of the embodiment 27;

FIG. 59 represents a cross sectional view of the objective lens system according to the embodiment 34 of the present invention; and FIGS. 60A to 60C represent the aberration curves of the embodiment 34;

DETAILED DESCRIPTION OF THE PREFERRED EMBODIMENTS

Figure 1:
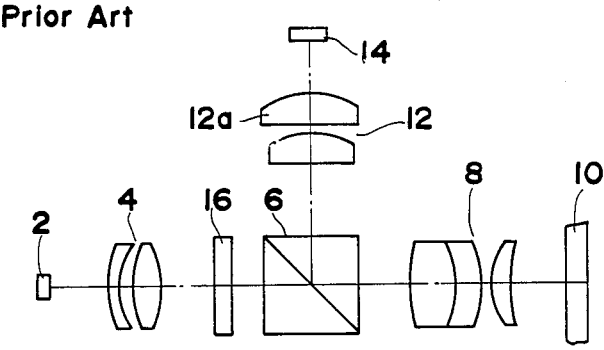
FIG. 1 represents a cross sectional view of the optical system for optical recording type disks according to the prior art.
Figure 2:
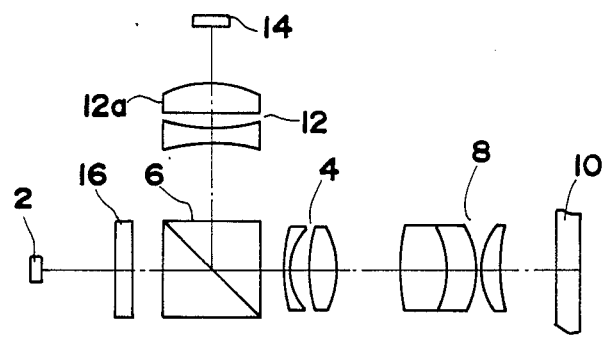
FIG. 2 represents a cross sectional view of the optical system for optical recording type disks according to another prior art.

The following description is provided to enable any person skilled in the optical field to make and use the invention and sets forth the best modes contemplated by the inventors for carrying our invention. Various modifications, however, will remain readily apparent to those skilled in the art, since the generic principles of the present invention have been defined herein specifically to provide a relatively economical and easily manufactured objective lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system.

In the drawings, schematic cross sectional views disclose the position of the lens elements. Due to the number of lens elements involved, it was not deemed appropriate to include individual designation of the radii of curvature and axial distances for each lens element and air space. These values, however, are provided in the accompanying tables set forth herein, and the schematic cross sectional views of the respective embodiments follow the normal conventions of the light source at the left-hand side of the drawing and the disk at the right-hand side.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

Figure 3:
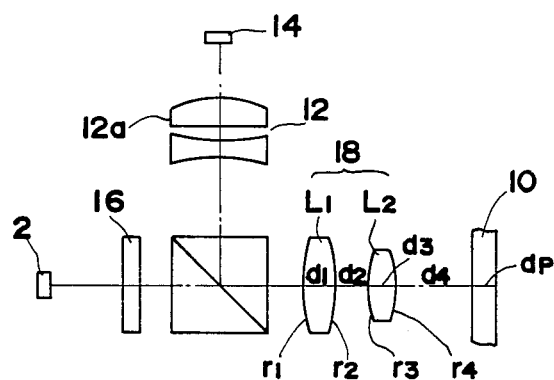
FIG. 3 represents a cross sectional view of the optical system for optical recording type disks according to the present invention.
Figure 4:
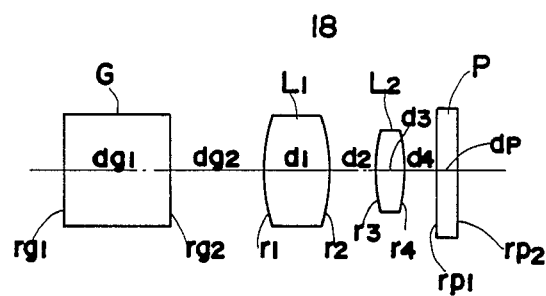
FIG. 4 represents a cross sectional view of the objective lens system for optical recording type disks according to the embodiments 1, 2, 3, 4 and 7 of the present invention.
Figure 5:
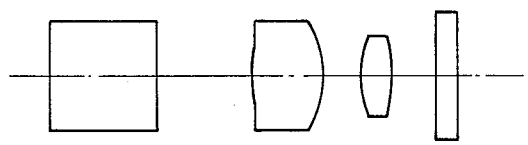
FIG. 5 represents a cross sectional view of the objective lens system according to the embodiments 8, 9, 11, 13, 15 of the present invention.
Figure 6:
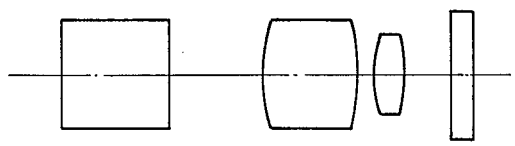
FIG. 6 represents a cross sectional view of the objective lens system according to the embodiments 6 and 14 of the present invention.
Figure 7:
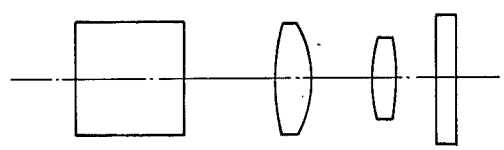
FIG. 7 represents a cross sectional view of the objective lens system according to the embodiments 5, 10 and 12 of the present invention.
Figure 8:
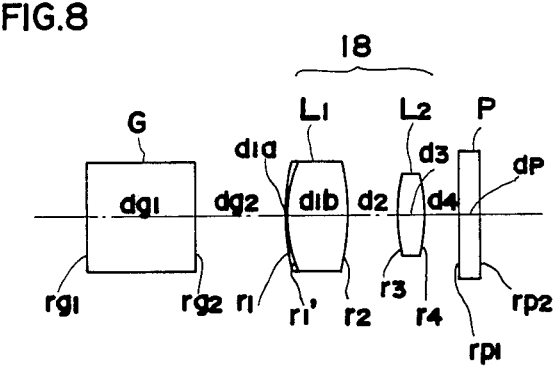
FIG. 8 represents a cross sectional view of the objective lens system according to the embodiment 16 of the present invention.
Figure 9A:
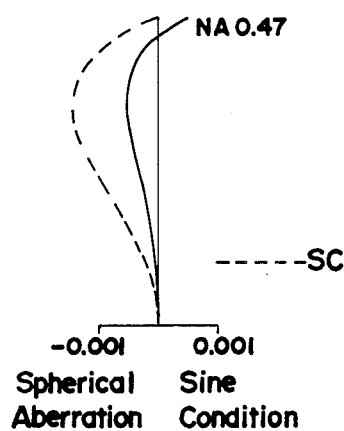
FIGS. 9A to 9C represent the aberration curves of the embodiment 1.
Figure 9B:
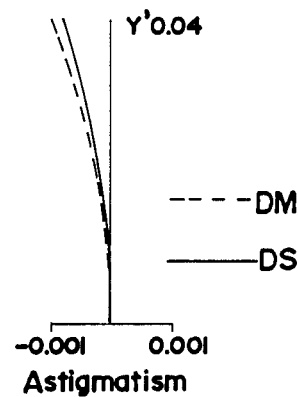
Figure 9C:
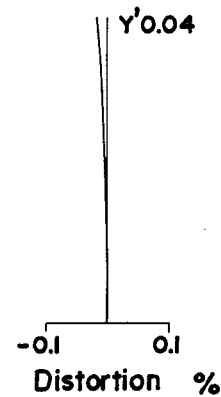
Figure 10A:
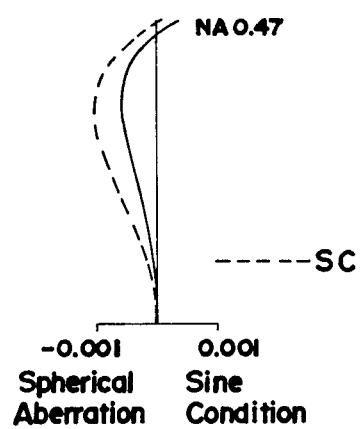
FIGS. 10A to 10C represent the aberration curves of the embodiment 2.
Figure 10B:
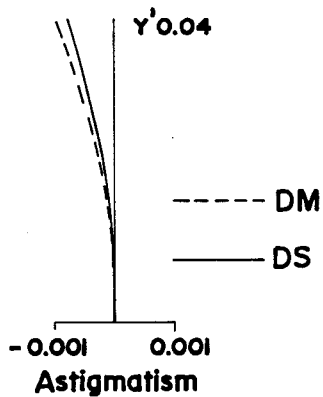
Figure 10C:
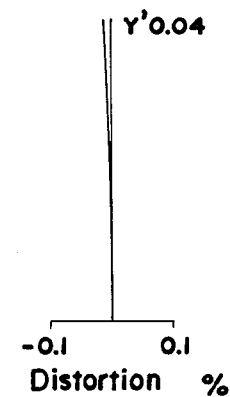
Figure 11A:
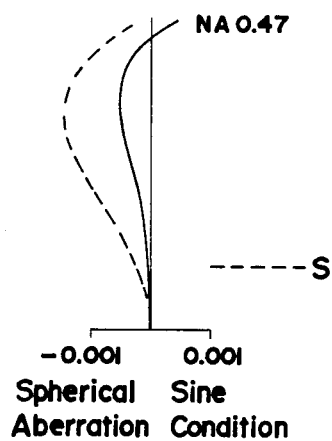
FIGS. 11A to 11C represent the aberration curves of the embodiment 3.
Figure 11B:
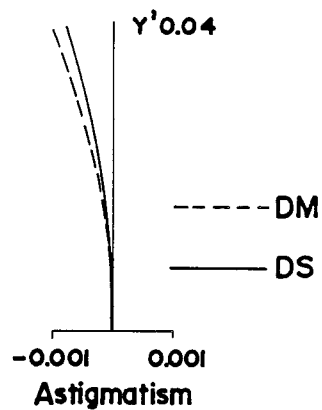
Figure 11C:
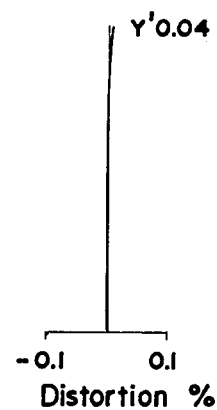
Figure 12A:
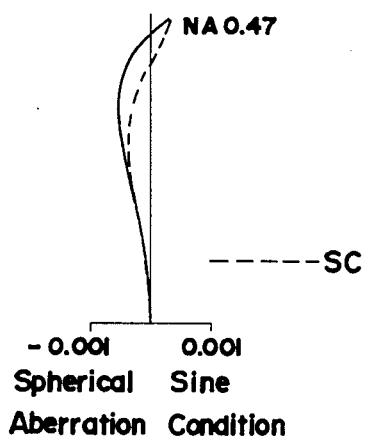
FIGS. 12A to 12C represent the aberration curves of the embodiment 4.
Figure 12B:
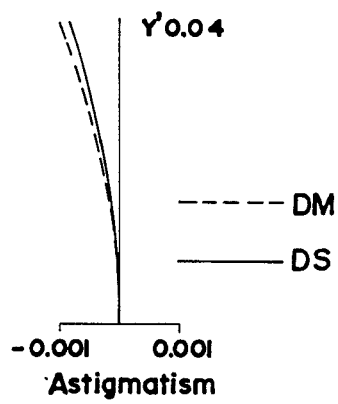
Figure 12C:
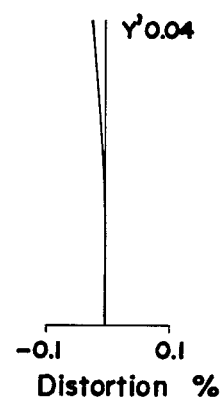
Figure 13A:
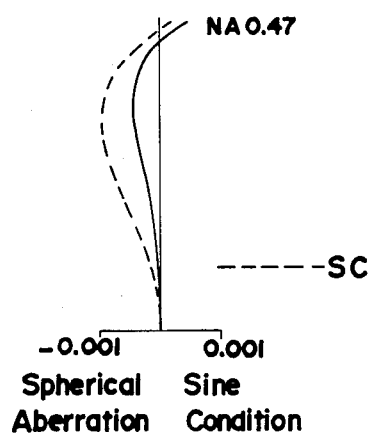
FIGS. 13A to 13C represent the aberration curves of the embodiment 5.
Figure 13B:
Figure 13C:
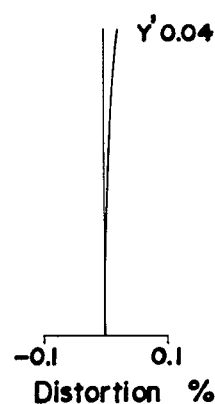
Figure 14A:
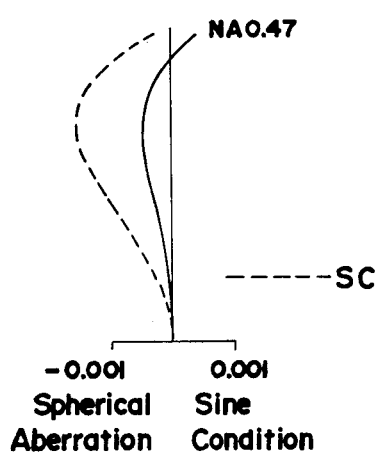
FIGS. 14A to 14C represent the aberration curves of the embodiment 6.
Figure 14B:
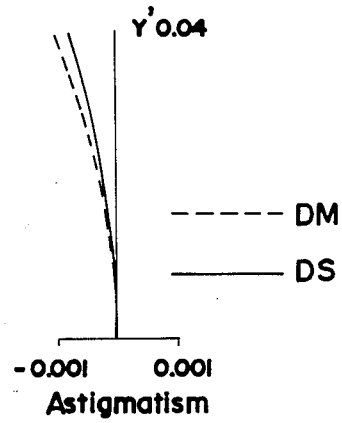
Figure 14C:
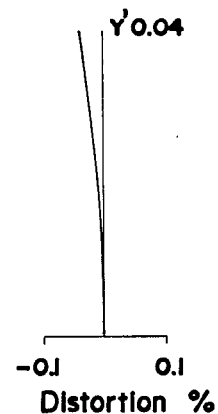
Figure 15A:
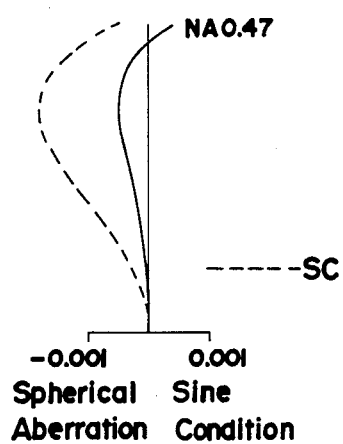
FIGS. 15A to 15C represent the aberration curves of the embodiment 7.
Figure 15B:
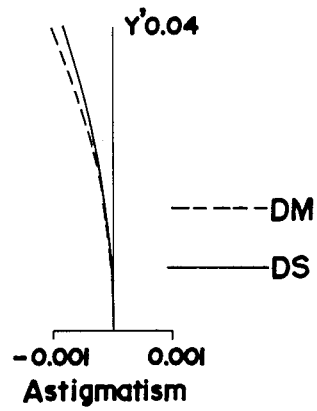
Figure 15C:
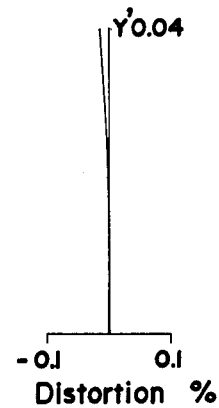
Figure 16A:
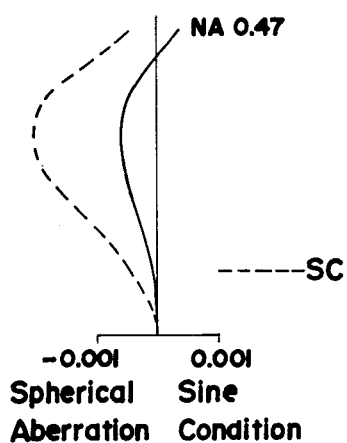
FIGS. 16A to 16C represent the aberration curves of the embodiment 8.
Figure 16B:
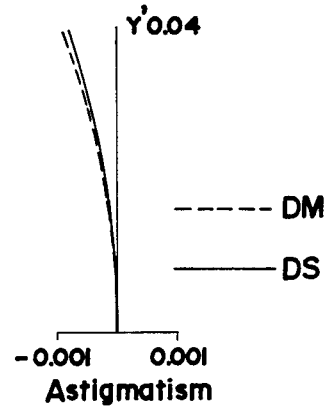
Figure 16C:
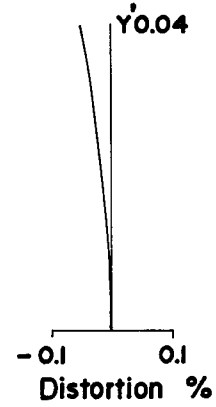
Figure 17A:
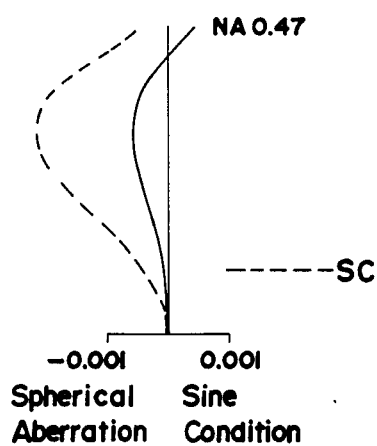
FIGS. 17A to 17C represent the aberration curves of the embodiment 9.
Figure 17B:
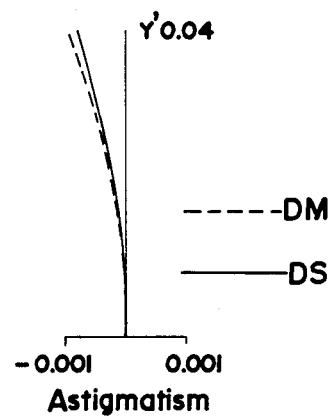
Figure 17C:
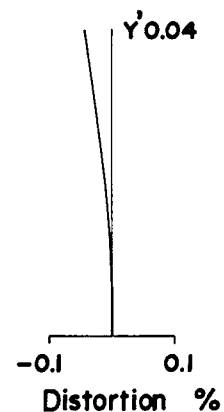
Figure 18A:
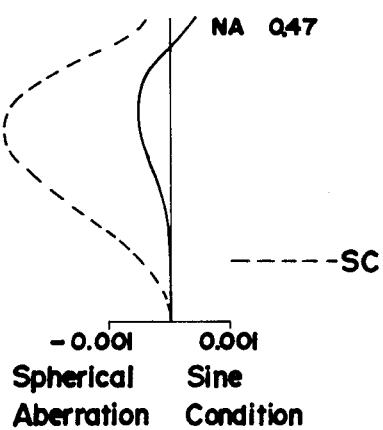
FIGS. 18A to 18C represent the aberration curves of the embodiment 10.
Figure 18B:
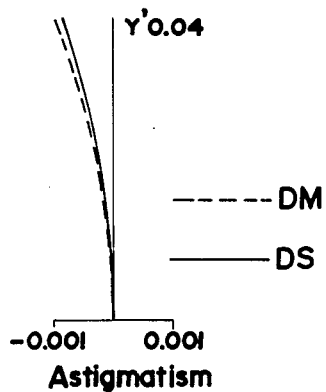
Figure 18C:
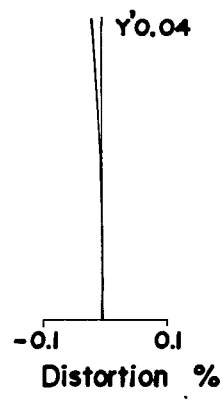
Figure 19A:
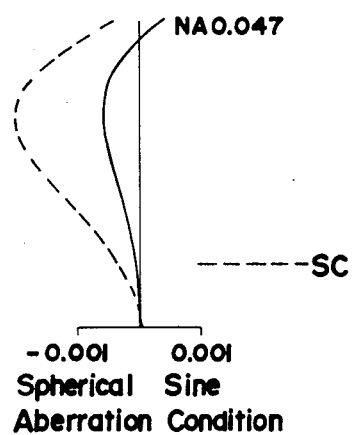
FIGS. 19A to 19C represent the aberration curves of the embodiment 11.
Figure 19B:
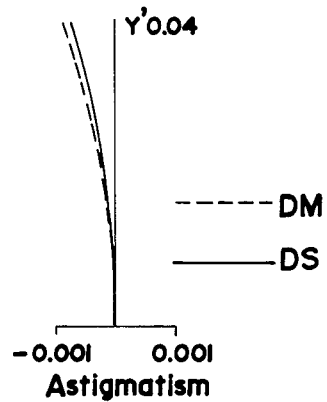
Figure 19C:
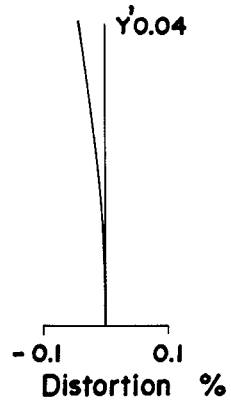
Figure 20A:
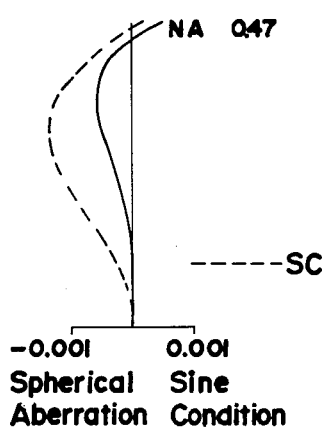
FIGS. 20A to 20C represent the aberration curves of the embodiment 12.
Figure 20B:
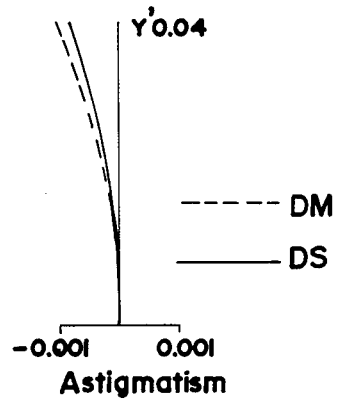
Figure 20C:
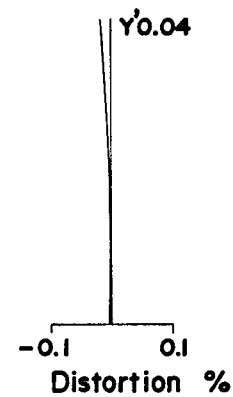
Figure 21A:
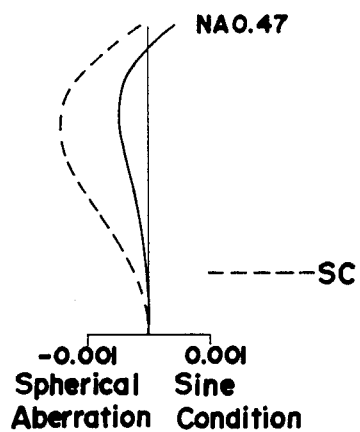
FIGS. 21A to 21C represent the aberration curves of the embodiment 13.
Figure 21B:
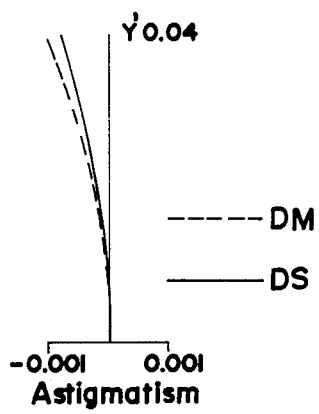
Figure 21C:
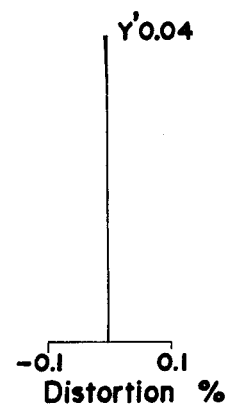
Figure 22A:
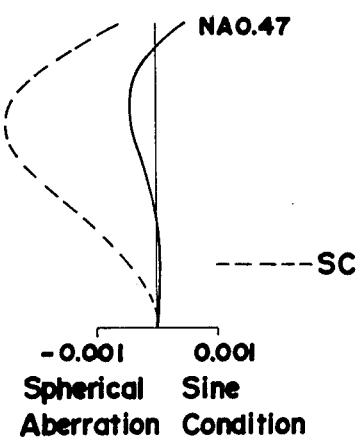
FIGS. 22A to 22C represent the aberration curves of the embodiment 14.
Figure 22B:
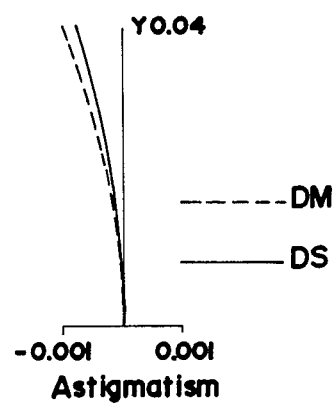
Figure 22C:
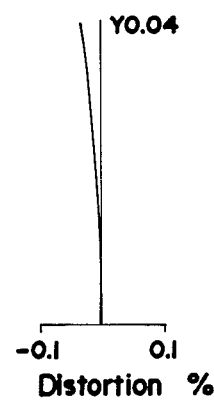
Figure 33:
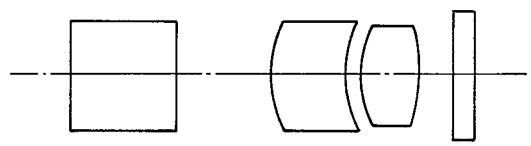
FIG. 33 represents a cross sectional view of the objective lens system according to the embodiment 21 of the present invention.
Figure 34:
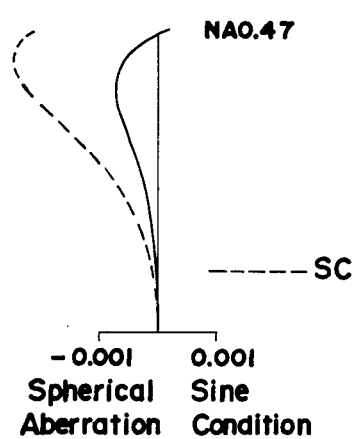
FIGS. 34A to 34C represent the aberration curves of the embodiment 21.
Figure 34:
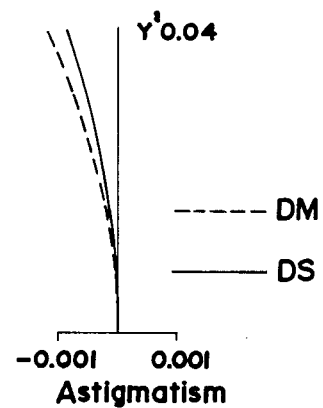
Figure 34:
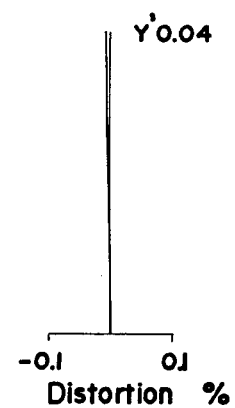
Figure 35:
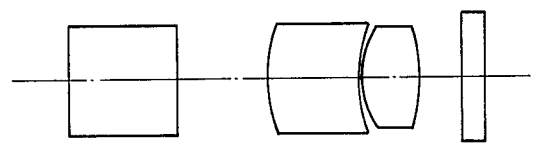
FIG. 35 represents a cross sectional view of the objective lens system according to the embodiment 22 of the present invention.
Figure 36A:
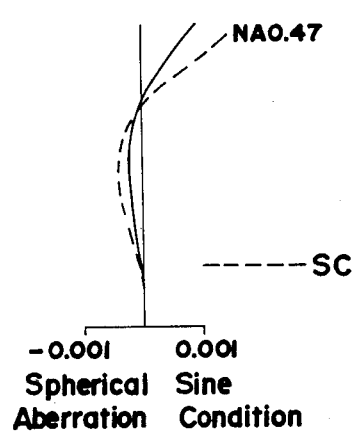
FIGS. 36A to 36C represent the aberration curves of the embodiment 22.
Figure 36B:
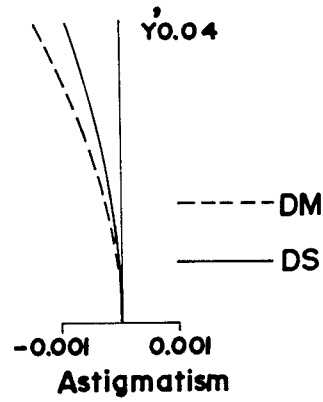
Figure 36C:
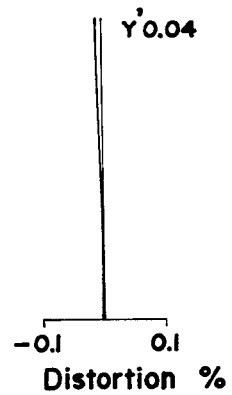
Figure 37:
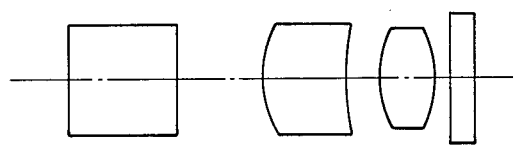
FIG. 37 represents a cross sectional view of the objective lens system according to the embodiment 23 of the present invention.
Figure 38A:
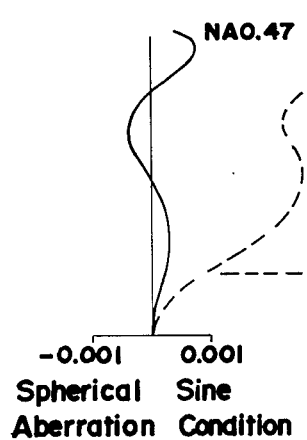
FIGS. 38A to 38C represent the aberration curves of the embodiment 23.
Figure 38B:
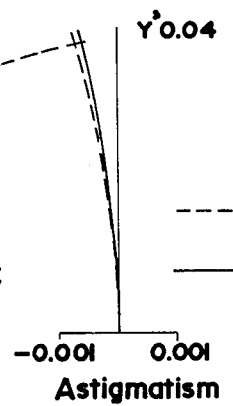
Figure 38C:
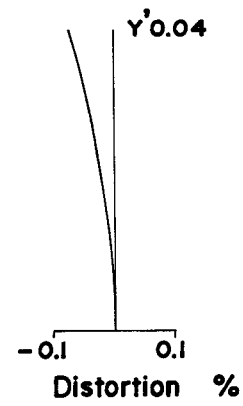
Figure 39:
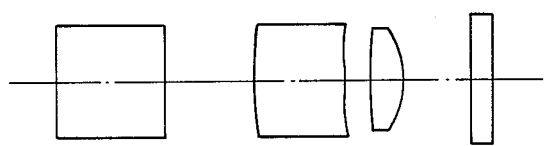
FIG. 39 represents a cross sectional view of the objective lens system according to the embodiment 24 of the present invention.
Figure 40A:
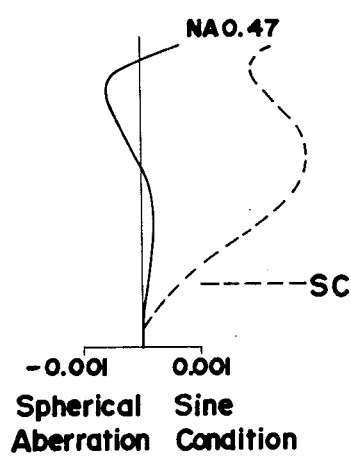
FIGS. 40A to 40C represent the aberration curves of the embodiment 24.
Figure 40B:
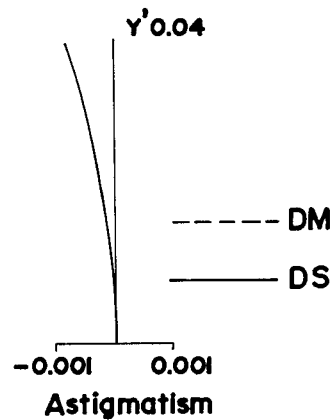
Figure 40C:
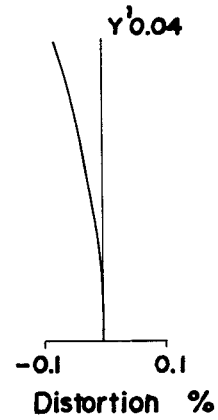
Figure 41:
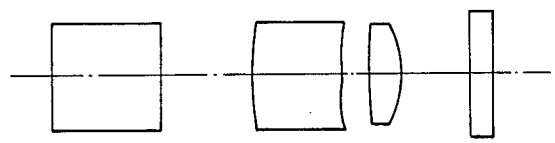
FIG. 41 represents a cross sectional view of the objective lens system according to the embodiment 25 of the present invention.
Figure 42A:
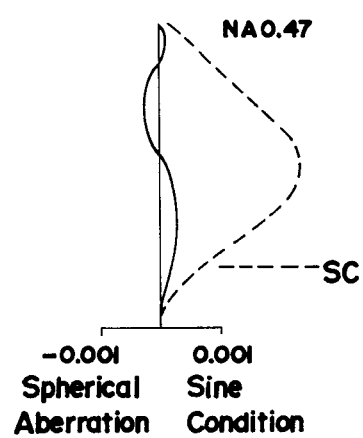
FIGS. 42A to 42C represent the aberration curves of the embodiment 25.
Figure 42B:
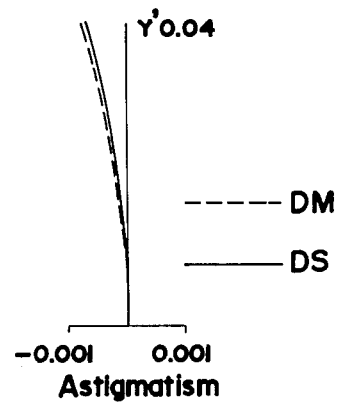
Figure 42C:
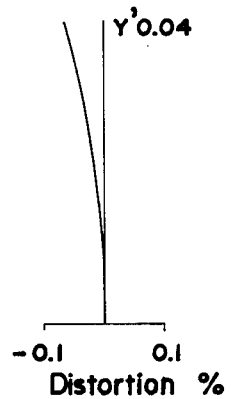
Figure 43:
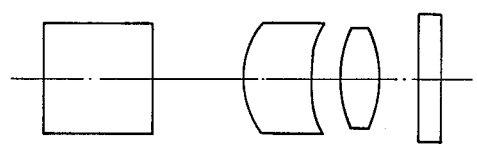
FIG. 43 represents a cross sectional view of the objective lens system according to the embodiment 26 of the present invention.
Figure 44A:
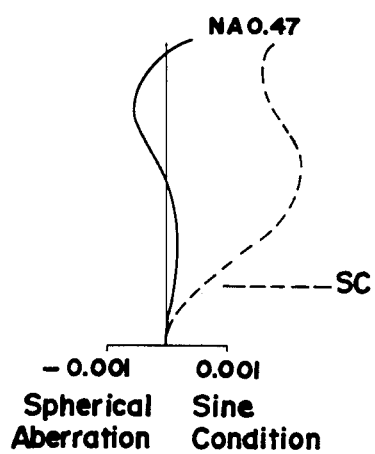
FIGS. 44A to 44C represent the aberration curves of the embodiment 26.
Figure 44B:
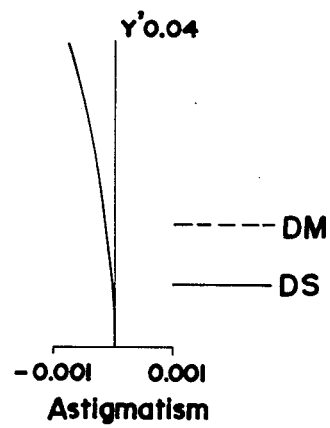
Figure 44C:
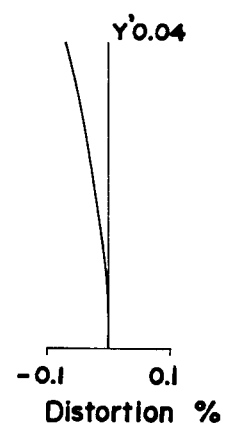
Figure 47:
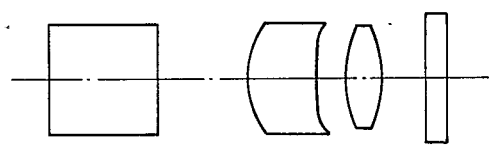
FIG. 47 represents a cross sectional view of the objective lens system according to the embodiment 28 of the present invention.
Figure 48A:
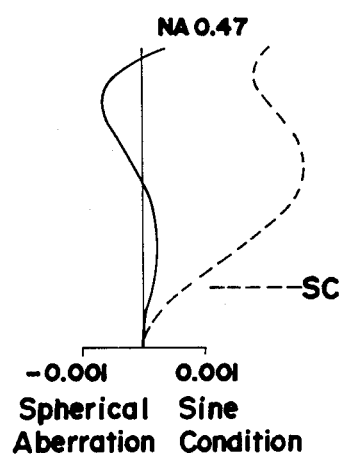
FIGS. 48A to 48C represent the aberration curves of the embodiment 28.
Figure 48B:
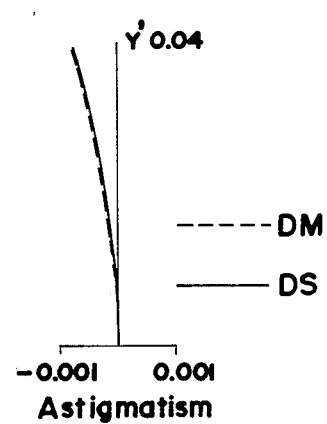
Figure 48C:
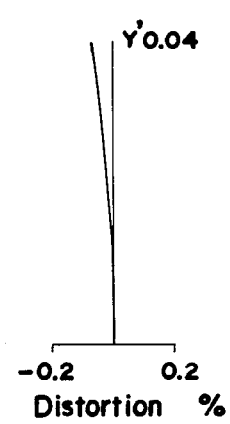
Figure 49:
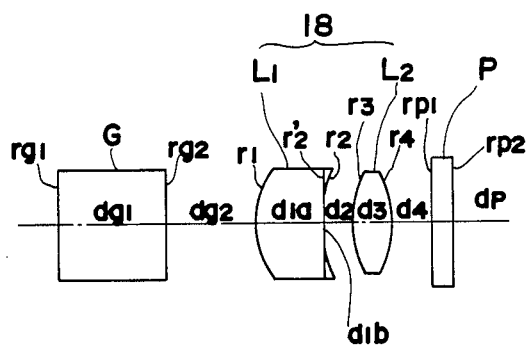
FIG. 49 represents a cross sectional view of the objective lens system according to the embodiment 29 of the present invention.
Figure 50A:
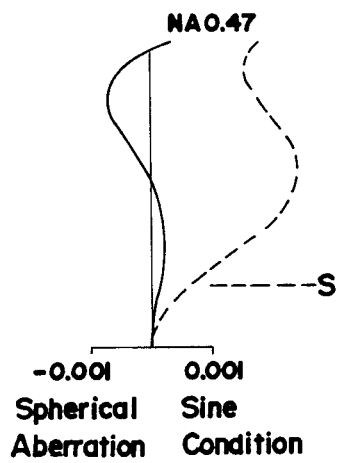
FIGS. 50A to 50C represent the aberration curves of the embodiment 29.
Figure 50B:
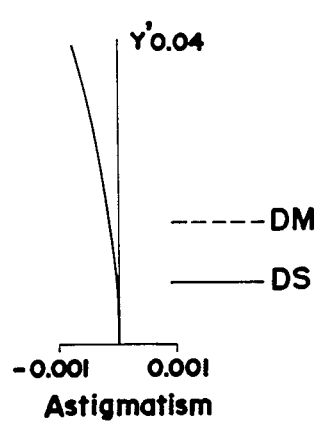
Figure 50C:
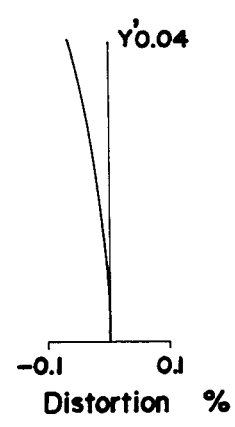
Figure 51:
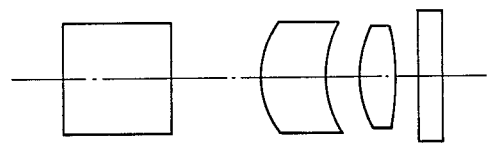
FIG. 51 represents a cross sectional view of the objective lens system according to the embodiment 30 of the present invention.
Figure 52A:
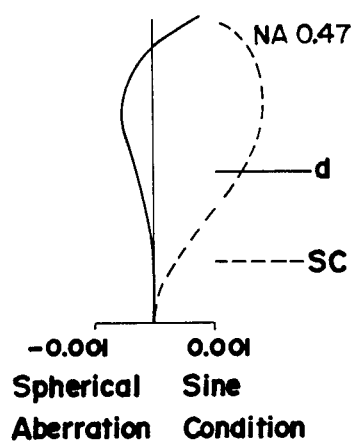
FIGS. 52A to 52C represent the aberration curves of the embodiment 30.
Figure 52B:
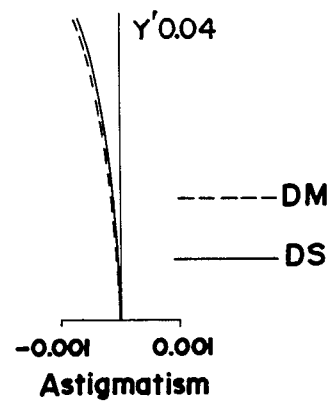
Figure 52C:
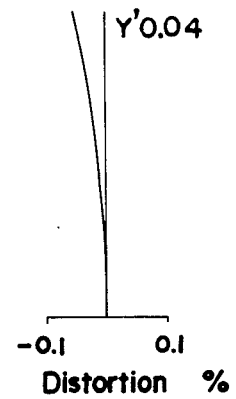
Figure 53:
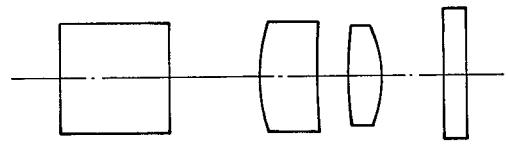
FIG. 53 represents a cross sectional view of the objective lens system according to the embodiment 31 of the present invention.
Figure 54A:
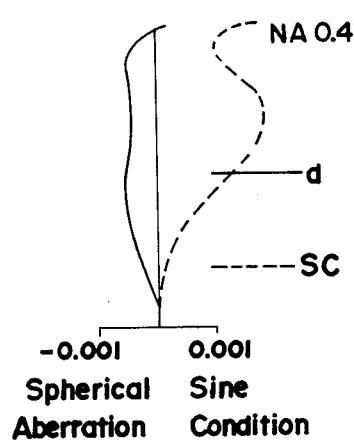
FIGS. 54A to 54C represent the aberration curves of the embodiment 31.
Figure 54B:
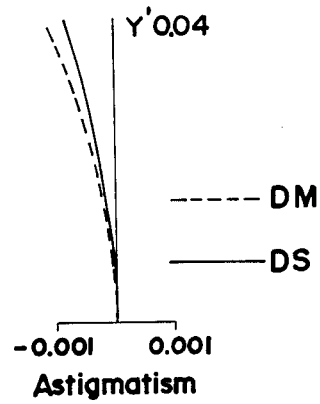
Figure 54C:
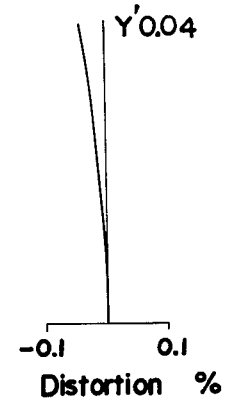
Figure 55:
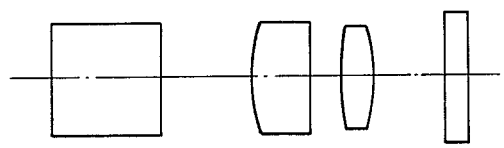
FIG. 55 represents a cross sectional view of the objective lens system according to the embodiment 32 of the present invention.
Figure 56A:
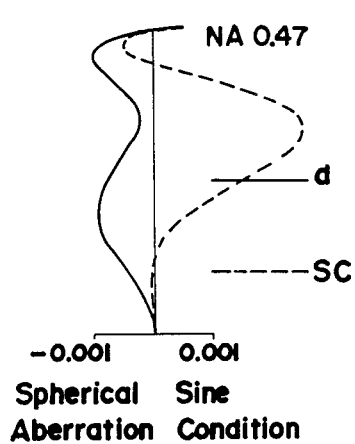
FIGS. 56A to 56C represent the aberration curves of the embodiment 32.
Figure 56B:
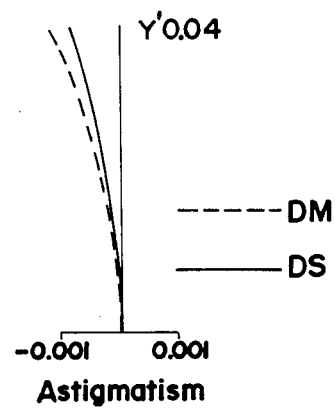
Figure 56C:
Figure 57:
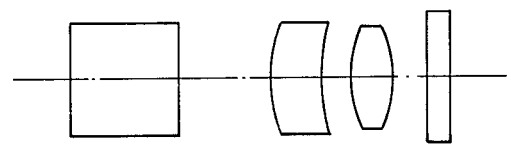
FIG. 57 represents a cross sectional view of the objective lens system according to the embodiment 33 of the present invention.
Figure 58A:
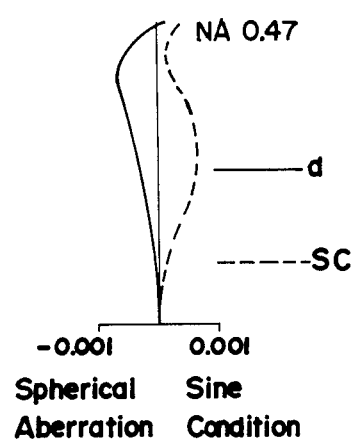
FIGS. 58A to 58C represent the aberration curves of the embodiment 33.
Figure 58B:
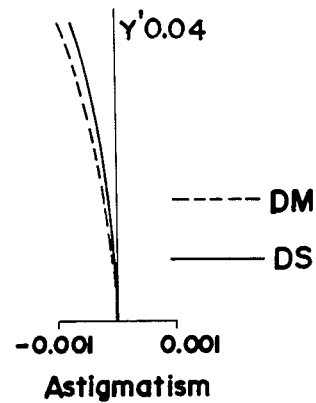
Figure 58C:
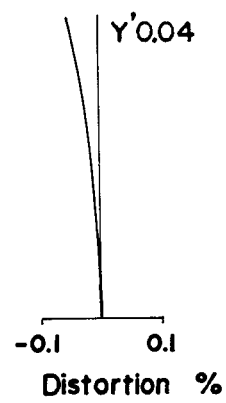

As shown in FIG. 3, the present invention provides the objective lens system (18) for optical recording type disks, comprising from the light source side to the disk side, a first lens element ($L_1$) having a positive refractive power, said first lens element ($L_1$) having at least an aspherical a second lens element ($L_2$) having a positive refractive power, and wherein the objective lens system (18) fulfills the following condition:

$$-\tfrac{1}{2} < \beta < -\tfrac{1}{8} \quad (1)$$

wherein, $\beta$ represents the magnification of the whole lens system (18).

The objective lens system according to the present invention consist of only two lens elements ($L_1$) ($L_2$). If one of such two lens elements has a negative refracting power, a positive refracting power of another lens element must be too strong for obtaining a predetermined positive power of the whole lens system. Therefore, in the present invention, both of two lens elements have positive refracting powers, respectively.

In the present invention, the objective lens system (18) concentrate into a spot on the disk (10) the light emitted from the laser light source, without converting the light to a parallel light bundle by the conventional collimating lens system. Thus, the objective lens system according to the present invention must be corrected well in various aberrations with respect to a finite object. It is different from the conventional objective lens system which must be well corrected in various aberrations with respect to an infinite object, since the conventional objective lens system is located in a parallel light bundle formed by the collimating lens system. Thus, the magnification $\beta$ of the conventional objective lens system is zero.

On the other hand, the magnification $\beta$ of the objective lens system according to the present invention is limited as shown in the condition (1). If the upper limit of the condition (1) is violated, it is difficult to shorten the distance between the laser light source (2) and the disk (10). Contrary, if the lower limit of the condition (1) is violated, the following defects is present: At first, a space for locating the beam splitter or the diffraction grating is too decreased. Next, it becomes difficult to read the correct information memorized by the disk, since the information of high density memorized by the disk can not be magnified enough, and since the offaxial aberrations are generated. Therefore, the magnification $\beta$ of the objective lens system according to the present invention is limited as shown in the condition (1).

Here, even if the conventional objective lens system used in the magnification $\beta=0$ is applied to the optical system relating to the present invention in which the objective lens system is used in the magnification $\beta$ limited in the condition (1), it is impossible to achieve a high resolving power reaching to 1 $\mu$m because the numerical aperture NA is decreased. Namely, the following relationship is held:

$$NA_\beta = NA_\infty/(1-\beta)$$

wherein, $NA_\beta$ represents the numerical aperture of the lens system when $\beta < 0$, $NA_\infty$ represents the numerical aperture thereof when $\beta = 0$, and $\beta$ represents the magnification thereof. Thus, if the objective lens system having a numerical aperture $NA_\infty = 0.45$ is used in the condition $\beta = -\tfrac{1}{4}$, the numerical aperture $NA_\beta$ in such condition is 0.36. Therefore, it is impossible to achieve the resolving power of 1 $\mu$m. Here, if the diameter of the objective lens system is increased in order to increasing the numerical aperture thereof in such condition, it becomes difficult to correct the various aberrations well. Therefore, the conventional objective lens system used in the condition $\beta=0$ can not used in the magnification limited in the condition (1).

However, if the conventional objective lens system itself is shifted for tracking such lens system should be corrected in various aberrations with respect only to the paraxial rays, because the parallel light rays are always incident on such lens system. On the other hand, if the objective lens system according to the present invention is shifted for tracking, various aberrations must be also corrected well for the offaxial rays. Thus, the objective lens system according to the present invention must be corrected well in various aberrations not only for the paraxial rays but also for the offaxial rays.

In the present invention, an aspherical surface is introduced in order to correct the aberrations well. Here, it is not effective for improving the aberrations to introduce an aspherical surface to the second lens element ($L_2$). The reason is as follows: In the objective lens system according to the present invention, the light rays emitted from the light source (2) are incident on the second lens element ($L_2$) after they has been refracted by the first lens element ($L_1$). Thus, a height of a light ray incident on the first lens element ($L_1$) is relatively larger than that on the second lens element ($L_2$). Therefore, if an aspherical surface is introduced to any surface of the second lens element ($L_2$) for correcting the spherical aberration, the large coma aberration is generated in the offaxial region and can not be corrected.

Therefore, in the present invention, an aspherical surface is introduced to either of the two surfaces of the first lens element ($L_1$). In the case when the light source side surface ($r_1$) of the first lens element ($L_1$), the positive spherical aberration is generated too much by the surface ($r_1$), and other three surfaces ($r_2$) ($r_3$) and ($r_4$) of the first and second lens elements ($L_1$) and ($L_2$) not only correct the coma aberration and the astigmatism well, but also generate the negative spherical aberration for cancelling the above positive spherical aberration. Thus, good correction of the aberrations is achieved in both of the paraxial and offaxial regions.

The light source side surface ($r_1$) of the first lens element ($L_1$), should meet the following conditions to be effective for correcting the aberrations and for securing a proper working distance.

$$0.70 < f_1/f_2 < 1.50 \tag{2}$$

$$0.33 < f_1/f < 1.30 \tag{3}$$

$$-1.00 < \frac{r_1 + r_2}{r_1 - r_2} < 1.00 \tag{4}$$

wherein, $f_1$ represents the focal length of said first lens element ($L_1$), $f_2$ represents the focal length of the second lens element ($L_2$), $d_1$ represents the axial thickness ($d_1$) of the first lens element ($L_1$), f represents the focal length of the whole lens system, $r_1$ represents the paraxial radius of curvature of the light source side surface ($r_1$) of the first lens element ($L_1$), and $r_2$ represents the radius of curvature of the disk side surface ($r_2$) of the first lens element ($L_1$).

Condition (2) defines the ratio in refraction index between the first and second lens element ($L_1$) and ($L_2$). If the focal length $f_1$ of the first lens element ($L_1$) becomes short over the lower limit of the condition (2), the working distance of such lens system becomes too short. Therefore, such lens system is impractical since it is in danger to collide with the disk by the vibration. On the other hand, if the focal length $f_1$ of the first lens element ($L_1$) becomes long over the upper limit of the condition (2), since the refractive power of the second lens element ($L_2$) becomes great compared with that of the first lens element ($L_1$), it becomes difficult to correct the coma aberration and the astigmatism in the offaxial region well.

Condition (3) limits the axial thickness $d_1$ of the first lens element ($L_1$). The axial thickness $d_1$ mainly influences the working distance WD of the objective lens system and the correction of the astigmatism and the coma aberration in the offaxial region. If the lower limit of the condition (3) is violated, it becomes impossible to secure enough working distance, because the axial distance $d_2$ between the disk side surface ($r_2$) of the first lens element ($L_1$) and the light source side surface ($r_3$) of the second lens element ($L_2$) must become large for correcting the aberrations in the offaxial region. Furthermore, the aberrations in the offaxial region are deteriorated considerably compared with that in the paraxial region, because the inclination of the image plane of the objective lens becomes large. On the other hand, if the upper limit of the condition (3) is violated, although the working distance WD is secured enough, the compactness of the objective lens system is deteriorated and the weight thereof becomes too heavy, since the axial thickness ($d_1$) of the first lens element ($L_1$) becomes excessively large.

Condition (4) limits the shape of the first lens element ($L_1$). It means that the first lens element (L) is a bi-convey lens element. If the lower limit of the condition (4) is violated, the astigmatism is generated excessively. Here, although such astigmatism would be corrected well by means of the second lens element ($L_2$), it becomes difficult to correct the coma aberration. If the upper limit of the condition (4) is violated, it becomes difficult to correct the aberrations, since the refractive power of the first lens element ($L_1$) becomes too weak so that the height of the light rays incident on the second lens element ($L_2$) becomes too large.

In addition to the above conditions (1) to (4), the following conditions is effective for correcting the aberrations in both of the paraxial and offaxial region.

$$0.2 < \phi_3 < 0.7 \tag{5}$$

$$0.6 < \phi_2 + \phi_3 < 1.0 \tag{6}$$

$$|\phi_2 - \phi_3| < 0.6 \tag{7}$$

provided by, $\phi_2 = (1 - N_1) \cdot f/r_2$, and $\phi_3 = (N_2 - 1) \cdot f/r_3$, wherein, $N_1$ represents the refractive index of the first lens element ($L_1$), $N_2$ represents the refractive index of the second lens element ($L_2$) and $r_3$ represents the radius of curvature of the light source side surface ($r_3$) of the second lens element ($L_2$).

Condition (5) defines the refractive power of the light source side surface ($r_3$) of the second lens element ($L_2$). If the lower limit of the condition (5) is violated, it is necessary to increase the refractive power of the disk side surface ($r_4$) of the second lens element ($L_2$) for achieving a predetermined magnification, which causes to generate the coma aberration undesirably, and to increase undesirably the sensitivity of the optical performance to a manufacturing error, since the radius of curvature of the disk side surface ($r_4$) of the second lens element ($L_2$) becomes too small. On the other hand, if the upper limit of the condition (5) is violated, the optical performance in the offaxial region is excessively deteriorated since the astigmatism is considerably generated.

Conditions (6) and (7) relate to the balance in refractive power between the disk side surface ($r_2$) of the first lens element ($L_1$) and the light source side surface ($r_3$) of the second lens element ($L_2$). If the lower limit of the condition (6) is violated, the coma aberration is undesirably generated, since it is necessary to increase the refractive powers of the light source side surface ($r_1$) of the first lens element ($L_1$) and the disk side surface ($r_4$) of the second lens element ($L_2$) for achieving the predetermined magnification. Contrary, if the upper limit of the condition (6) is violated, the radii of curvature of the disk side surface ($r_2$) of the first lens element ($L_1$) and the light source side surface ($r_3$) of the second lens element ($L_2$) become considerably smaller since the refractive indices of such two surfaces ($r_2$) and ($r_3$) become too strong, and causes an increase in the sensitivity of the optical performance to manufacturing errors. If the upper or lower limit of the condition (7) is violated, the proper balance between the refractive power of the disk side surface ($r_2$) of the first element ($L_1$) and that of the light source side surface ($r_3$) of the second lens element ($L_2$) can not be maintained, and results the correction of the aberrations in the offaxial region, especially the correction of the astigmatism therein, becomes difficult.

In the case when an aspherical surface is introduced on the disk side surface ($r_2$) of the first lens element ($L_1$), it is possible to correct not only the spherical aberration but also to correct the astigmatism and the coma aberration in the offaxial region. In this case, the following conditions are effective for correcting the aberrations;

$$0.47 < d_1/f < 1.25 \tag{8}$$

$$0 < d_2/d_1 < 1.00 \tag{9}$$

wherein, f represents the focal length of the whole lens system, $d_1$ represents the axial thickness ($d_1$) of the first lens element ($L_1$), and $d_2$ represents the axial distance ($d_2$) between the disk side surface ($r_2$) of the first lens element ($L_1$) and the light source side surface ($r_3$) of the second lens element ($L_2$).

Condition (8) is effective for correcting the astigmatism. If the lower limit of the condition (8) is violated, it is difficult to correct the astigmatism, and to secure the proper edge thickness of the first lens element ($L_1$) since the axial thickness thereof becomes too small. If the upper limit of condition (8) is violated, it is difficult to correct the spherical aberration even though an aspherical surface is introduced to the lens system. Furthermore, the total weight of the objective lens system becomes too heavy for practical use since the thickness of the first lens element ($L_1$) becomes too thick.

On the other hand, if the upper limit of condition (9) is violated by increasing the axial distance ($d_2$), it becomes difficult to correct the spherical aberration since the refractive power of the disk side surface ($r_2$) of the first lens element ($L_1$) must be increased, even though an aspherical surface is introduced to such surface ($r_2$). Furthermore, if the upper limit of the condition (9) is violated by increasing the axial distance ($d_2$), it becomes difficult to correct the coma aberration. Namely, although the coma aberration, which is increased in proportion to an increase in the axial distance ($d_2$), may be corrected by increasing the axial thickness ($d_1$) of the first lens element ($L_1$), such correction is improper since the axial thickness ($d_1$) is limited in the condition (8).

In the case when an aspherical surface is introduced on the disk side surface ($r_2$) of the first lens element ($L_1$), the following conditions are further effective for correcting the coma aberration in addition to the above conditions (8) and (9):

$$0.80 < f \cdot (\phi_1 + \phi_4) < 1.30 \tag{10}$$

$$0.10 < f \cdot \phi_4 < 0.80 \tag{11}$$

provided by, $\phi_4 = (1 - N_2)/r_4$, $\phi_1 = (N_1 - 1)/r_1$, wherein, $N_1$ represents the refractive index of the first lens component ($L_1$), $N_2$ represents the refractive index of the second lens component ($L_2$), $r_1$ represents the radius of curvature of the light source side surface ($r_1$) of the first lens element ($L_1$), and $r_4$ represents the radius of curvature of the disk side surface ($r_4$) of the second lens element ($L_2$).

In order to correct the coma aberration well, a proper balance between the refractive power of the light source side surface ($r_1$) of the first lens element ($L_1$) and that of the disk side surface ($r_4$) of the second lens element ($L_2$), is necessary. The condition (10) defines such balance. If the lower limit of the condition (10) is violated, spherical aberration is undesirably generated. Here, although such spherical aberration may be corrected by increasing the refractive power of the light source side surface ($r_1$) of the first lens element ($L_1$), such correction generates excessive coma aberration, since the above proper balance is not maintained. Such coma aberration can not be corrected by introducing an aspherical surface to the disk side surface ($r_2$) of the first lens element ($L_1$). On the other hand, if the upper limit of the condition (10) is violated, the coma aberration is generated excessively, which can not be corrected by introducing an aspherical surface.

The condition (11) defines the refractive power of the disk side surface ($r_4$) of the second lens element ($L_2$). If the lower limit of the condition (11) is violated, the refractive power of the light source side surface ($r_1$) of the first lens element ($L_1$) must become too strong, in order to achieving a predetermined refractive power of the objective lens system. This generates undesirable the coma aberration, which can not be corrected by introducing an aspherical surface. If the upper limit of the condition (11) is violated, the refractive power of the disk side surface ($r_4$) of the second element ($L_2$) becomes too strong. This results in the generation of coma aberration on such surface ($r_4$), which would not be corrected well.

In the present invention, a method for manufacturing a lens element having an aspherical surface is not limited at all. For example, such a lens element can be manufactured by a press, if it is constituted of a glass material. On the other hand, such a lens element can be manufactured by well-known molding method, if it is constituted of a plastic material. Furthermore, such a lens element can be manufactured by cementing a thin layer of a synthetic resin or a plastic material, which has an aspherical surface of desired shape, to a predetermined spherical surface of a lens element made of a glass material, the spherical surface having paraxial radius of curvature of the desired aspherical surface, as shown in the embodiments 16 and 29 indicated below.

The following Tables 1 to 34 disclose, respectively, the first through thirty-fourth embodiments of the present invention. In the Tables, f equals the focal length, r is the radius of curvature with respective sub numbers indicating the surfaces from the light source to disk side along the optical axis, d represents the axial distance and includes both the air spaces and the actual thickness of the lenses along the optical axis, and finally n equals the refractive index in the wavelength $\lambda = 800$ nm and again, the sub numbers refer to the particular optical element from the light source to disk side. The asterisk (*) represents the aspheric surface defined as follows, and its coefficients are shown at the bottom of respective Tables:

$$X = 1 + \sqrt{\frac{C_o h^2}{1 - \epsilon C_o^2 h^2}} + \Sigma C_i h^{2i} \; (i = 1, 2, 3 \ldots)$$

wherein, X represents the coordinate along the optical axis measured from the top of the basic surface, h represents the coordinate perpendicular to the optical axis measured from the optical axis (height from the optical axis), Co represents the curvature (1/r) of the basic surface, Ci represent the aspherical surface coefficients, and $\epsilon$ represents the quadric surface coefficient of the basic surface.

To all Tables, in addition to the objective lens system according to each embodiment, a glass block (G) is shown in the light source side of the objective lens system, which corresponds to the beam splitter (6), the diffraction grating (16) or a cover glass of the laser light source (2). The radii of curvature of the light source side surface ($r_{g1}$) of the glass block (G) and the disk side surface ($r_{g2}$) thereof are indicated as $r_{g1}$ and $r_{g2}$, respectively, in the Tables. The axial thickness ($d_{g1}$) of the galss block (G) is indicated as $d_{g1}$, and the axial distance ($d_{g2}$) between the disk side surface ($r_{g2}$) of the glass block (G) and the light source side surface ($r_1$) of the first lens element ($L_1$). The refractive index of the glass block (G) in the wavelength of 800 nm is indicated as Ng. Furthermore, in all embodiments, a plate (P) is located on the disk side of the objective lens system, which corresponds to the disk (10). The radii of curvature of the plate (P) are indicated as $r_{p1}$ and $r_{p2}$ from the light source to the disk side, respectively. The axial distance between the disk side surface ($r_4$) of the second lens element ($L_2$) and the light source side surface ($r_{p1}$) of the plate (P) is indicated as $d_4$, and the axial thickness of the plate (P) is indicated as $d_p$. The refractive index of the plate (P) in the wavelength of 800 nm is indicated as Np.

Furthermore, in all Tables, NA represents the numerical aperture of the objective lens system according to the embodiment of the disk side, f represents the focal length thereof, WD represent the working distance thereof, and $\beta$ represents the magnification thereof.

TABLE 1

[Embodiment 1]
NA = 0.47   f = 1.0   WD = 0.38   $\beta$ = −0.23

| | | radius of curvature | axial distance | | refractive index |
|---|---|---|---|---|---|
| G | $r_{g1}$ | ∞ | $d_{g1}$ 1.200 | $n_g$ | 1.51078 |
| | $r_{g2}$ | ∞ | $d_{g1}$ 1.000 | | |
| $L_1$ | $r_1^*$ | 1.717 | $d_1$ 0.690 | $n_1$ | 1.76492 |
| | $r_2$ | −2.691 | $d_2$ 0.530 | | |
| $L_2$ | $r_3$ | 1.394 | $d_3$ 0.298 | $n_2$ | 1.76492 |
| | $r_4$ | −3.651 | $d_4$ 0.380 | | |
| P | $r_{p1}$ | ∞ | $d_p$ 0.240 | $n_p$ | 1.57147 |
| | $r_{p2}$ | ∞ | | | |

$\epsilon = 1.0$
aspherical surface coefficients $C_1 = 0.0$, $C_2 = -0.1265$, $C_3 = -0.24749 \times 10^{-1}$,
$C_4 = -0.29344 \times 10^{-1}$, $C_5 = 0.29848 \times 10^{-2}$
$f_1/f_2 = 1.09$
$d_1/f = 0.69$
$\dfrac{r_1 + r_2}{r_1 - r_2} = -0.22$
$\phi_3 = 0.55$
$\phi_2 + \phi_3 = 0.83$
$|\phi_2 - \phi_3| = 0.27$

TABLE 2

[Embodiment 2]
NA = 0.47   f = 1.0   WD = 0.38   $\beta$ = −0.23

| | | radius of curvature | axial distance | | refractive index |
|---|---|---|---|---|---|
| | $r_{g1}$ | ∞ | | | |

TABLE 2-continued

[Embodiment 2]
NA = 0.47   f = 1.0   WD = 0.38   $\beta$ = −0.23

| | | | | | |
|---|---|---|---|---|---|
| G | | | $d_{g1}$ 1.200 | $n_g$ | 1.51078 |
| | $r_{g2}$ | ∞ | $d_{g2}$ 1.000 | | |
| $L_1$ | $r_1^*$ | 1.857 | $d_1$ 0.580 | $n_1$ | 1.78458 |
| | $r_2$ | −2.817 | $d_2$ 0.620 | | |
| $L_2$ | $r_3$ | 1.681 | $d_3$ 0.306 | $n_2$ | 2.00000 |
| | $r_4$ | −4.519 | $d_4$ 0.380 | | |
| P | $r_{p1}$ | ∞ | $d_p$ 0.240 | $n_p$ | 1.57147 |
| | $r_{p2}$ | ∞ | | | |

$\epsilon = 1.0$
aspherical surface coefficients $C_1 = 0.0$, $C_2 = -0.12097$, $C_3 = -0.21258 \times 10^{-1}$,
$C_4 = -0.28685 \times 10^{-1}$, $C_5 = 0.30060 \times 10^{-2}$
$f_1/f_2 = 1.20$
$d_1/f = 0.58$
$\dfrac{r_1 + r_2}{r_1 - r_2} = -0.21$
$\phi_3 = 0.59$
$\phi_2 + \phi_3 = 0.87$
$|\phi_2 - \phi_3| = 0.31$

TABLE 3

[Embodiment 3]
NA = 0.47   f = 1.0   WD = 0.35   $\beta$ = −0.23

| | | radius of curvature | axial distance | | refractive index |
|---|---|---|---|---|---|
| G | $r_{g1}$ | ∞ | $d_{g1}$ 1.200 | $n_g$ | 1.51078 |
| | $r_{g2}$ | ∞ | $d_{g2}$ 1.000 | | |
| $L_1$ | $r_1^*$ | 1.862 | $d_1$ 0.600 | $n_1$ | 1.78458 |
| | $r_2$ | −2.033 | $d_2$ 0.608 | | |
| $L_2$ | $r_3$ | 2.088 | $d_3$ 0.240 | $n_2$ | 1.78458 |
| | $r_4$ | −2.264 | $d_4$ 0.350 | | |
| P | $r_{p1}$ | ∞ | $d_p$ 0.240 | $n_p$ | 1.57147 |
| | $r_{p2}$ | ∞ | | | |

$\epsilon = 1.0$
aspherical surface coefficients $C_1 = 0.0$, $C_2 = -0.16199$, $C_3 = -0.27646 \times 10^{-1}$
$C_4 = -0.30012 \times 10^{-1}$, $C_5 = 0.29488 \times 10^{-2}$
$f_1/f_2 = 0.94$
$d_1/f = 0.60$
$\dfrac{r_1 + r_2}{r_1 - r_2} = -0.04$
$\phi_3 = 0.38$
$\phi_2 + \phi_3 = 0.77$
$|\phi_2 - \phi_3| = 0.01$

TABLE 4

[Embodiment 4]
NA = 0.47   f = 1.0   WD = 0.36   $\beta$ = −0.15

| | | radius of curvature | axial distance | | refractive index |
|---|---|---|---|---|---|
| G | $r_{g1}$ | ∞ | $d_{g1}$ 1.200 | $n_g$ | 1.51078 |
| | $r_{g2}$ | ∞ | $d_{g2}$ 1.000 | | |
| $L_1$ | $r_1^*$ | 1.746 | $d_1$ 0.632 | $n_1$ | 1.65870 |
| | $r_2$ | −2.176 | $d_2$ 0.530 | | |

TABLE 4-continued

[Embodiment 4]
NA = 0.47   f = 1.0   WD = 0.36   β = −0.15

| | | | | | | |
|---|---|---|---|---|---|---|
| $L_2$ | { | $r_3$ | 1.248 | $d_3$ | 0.280 | $n_2$ | 1.62728 |
| | | $r_4$ | −2.228 | | | |
| | | | | $d_4$ | 0.360 | |
| P | { | $r_{p1}$ | ∞ | $d_p$ | 0.240 | $n_p$ | 1.57147 |
| | | $r_{p2}$ | ∞ | | | |

$\epsilon = 1.0$
aspherical surface coefficients $C_1 = 0.0$, $C_2 = -0.15705$,   $C_3 = -0.52788 \times 10^{-1}$,
$C_4 = -0.46595 \times 10^{-1}$,   $C_5 = 0.18594 \times 10^{-2}$
$f_1/f_2 = 1.19$
$d_1/f = 0.63$
$\dfrac{r_1 + r_2}{r_1 - r_2} = -0.11$
$\phi_3 = 0.50$
$\phi_2 + \phi_3 = 0.80$
$|\phi_2 - \phi_3| = 0.20$

TABLE 5

[Embodiment 5]
NA = 0.47   f = 1.0   WD = 0.31   β = −0.23

| | | radius of curvature | | axial distance | | refractive index |
|---|---|---|---|---|---|---|
| G | { | $r_{g1}$ | ∞ | $d_{g1}$ | 1.200 | $n_g$ | 1.51078 |
| | | $r_{g2}$ | ∞ | | | |
| | | | | $d_{g2}$ | 1.000 | |
| $L_1$ | { | $r_1{}^*$ | 1.532 | $d_1$ | 0.372 | $n_1$ | 1.78458 |
| | | $r_2$ | −3.025 | | | |
| | | | | $d_2$ | 0.718 | |
| $L_2$ | { | $r_3$ | 1.399 | $d_3$ | 0.236 | $n_2$ | 1.78458 |
| | | $r_4$ | −3.360 | | | |
| | | | | $d_4$ | 0.310 | |
| P | { | $r_{p1}$ | ∞ | $d_p$ | 0.240 | $n_p$ | 1.57147 |
| | | $r_{p2}$ | ∞ | | | |

$\epsilon = 1.0$
aspherical surface coefficients $C_1 = 0.0$, $C_2 = -0.12854$,   $C_3 = -0.20694 \times 10^{-2}$,
$C_4 = -0.28258 \times 10^{-1}$,   $C_5 = 0.30658 \times 10^{-2}$
$f_1/f_2 = 1.04$
$d_1/f = 0.37$
$\dfrac{r_1 + r_2}{r_1 - r_2} = -0.33$
$\phi_3 = 0.56$
$\phi_2 + \phi_3 = 0.82$
$|\phi_2 - \phi_3| = 0.30$

TABLE 6

[Embodiment 6]
NA = 0.47   f = 1.0   WD = 0.56   β = −0.23

| | | radius of curvature | | axial distance | | refractive index |
|---|---|---|---|---|---|---|
| G | { | $r_{g1}$ | ∞ | $d_{g1}$ | 1.200 | $n_g$ | 1.51078 |
| | | $r_{g2}$ | ∞ | | | |
| | | | | $d_{g3}$ | 1.000 | |
| $L_1$ | { | $r_1{}^*$ | 1.892 | $d_1$ | 1.000 | $n_1$ | 1.78458 |
| | | $r_2$ | −3.630 | | | |
| | | | | $d_2$ | 0.220 | |
| $L_2$ | { | $r_3$ | 1.627 | $d_3$ | 0.300 | $n_2$ | 1.78458 |
| | | $r_4$ | −3.469 | | | |
| | | | | $d_4$ | 0.560 | |
| P | { | $r_{p1}$ | ∞ | $d_p$ | 0.240 | $n_p$ | 1.57147 |
| | | $r_{p2}$ | ∞ | | | |

TABLE 6-continued

[Embodiment 6]
NA = 0.47   f = 1.0   WD = 0.56   β = −0.23

$\epsilon = 1.0$
aspherical surface coefficients $C_1 = 0.0$, $C_2 = -0.12306$,   $C_3 = -0.37974 \times 10^{-1}$,
$C_4 = -0.34173 \times 10^{-1}$,   $C_5 = 0.27858 \times 10^{-2}$
$f_1/f_2 = 1.19$
$d_1/f = 1.00$
$\dfrac{r_1 + r_2}{r_1 - r_2} = -0.31$
$\phi_3 = 0.48$
$\phi_2 + \phi_3 = 0.70$
$|\phi_2 - \phi_3| = 0.26$

TABLE 7

[Embodiment 7]
NA = 0.47   f = 1.0   WD = 0.37   β = −0.23

| | | radius of curvature | | axial distance | | refractive index |
|---|---|---|---|---|---|---|
| G | { | $r_{g1}$ | ∞ | $d_{g1}$ | 1.200 | $n_g$ | 1.51078 |
| | | $r_{g2}$ | ∞ | | | |
| | | | | $d_{g2}$ | 1.000 | |
| $L_1$ | { | $r_1{}^*$ | 1.736 | $d_1$ | 0.760 | $n_1$ | 1.78458 |
| | | $r_2$ | −2.193 | | | |
| | | | | $d_2$ | 0.460 | |
| $L_2$ | { | $r_3$ | 1.300 | $d_3$ | 0.280 | $n_2$ | 1.51078 |
| | | $r_4$ | −1.990 | | | |
| | | | | $d_4$ | 0.370 | |
| P | { | $r_{p1}$ | ∞ | $d_p$ | 0.240 | $n_p$ | 1.57147 |
| | | $r_{p2}$ | ∞ | | | |

$\epsilon = 1.0$
aspherical surface coefficients $C_1 = 0.0$, $C_2 = -0.14583$,   $C_3 = -0.34597 \times 10^{-1}$,
$C_4 = -0.29690 \times 10^{-1}$,   $C_5 = 0.29757 \times 10^{-2}$
$f_1/f_2 = 0.85$
$d_1/f = 0.76$
$\dfrac{r_1 + r_2}{r_1 - r_2} = -0.12$
$\phi_3 = 0.39$
$\phi_2 + \phi_3 = 0.75$
$|\phi_2 - \phi_3| = 0.03$

TABLE 8

[Embodiment 8]
NA = 0.47   f = 1.0   WD = 0.51   β = −0.23

| | | radius of curvature | | axial distance | | refractive index |
|---|---|---|---|---|---|---|
| G | { | $r_{g1}$ | ∞ | $d_{g1}$ | 1.200 | $n_g$ | 1.51078 |
| | | $r_{g2}$ | ∞ | | | |
| | | | | $d_{g2}$ | 1.000 | |
| $L_1$ | { | $r_1{}^*$ | 2.255 | $d_1$ | 0.766 | $n_1$ | 1.51078 |
| | | $r_2$ | −1.175 | | | |
| | | | | $d_2$ | 0.424 | |
| $L_2$ | { | $r_3$ | 1.126 | $d_3$ | 0.316 | $n_2$ | 1.51078 |
| | | $r_4$ | −2.141 | | | |
| | | | | $d_4$ | 0.510 | |
| P | { | $r_{p1}$ | ∞ | $d_p$ | 0.240 | $n_p$ | 1.57147 |
| | | $r_{p2}$ | ∞ | | | |

$\epsilon = 1.0$
aspherical surface coefficients $C_1 = 0.0$, $C_2 = -0.32781$,   $C_3 = -0.14437$,
$C_4 = -0.63998 \times 10^{-1}$,   $C_5 = 0.17108 \times 10^{-2}$
$f_1/f_2 = 1.10$
$d_1/f = 0.77$

TABLE 8-continued
[Embodiment 8]
NA = 0.47  f = 1.0  WD = 0.51  β = −0.23

$$\frac{r_1 + r_2}{r_1 - r_2} = 0.31$$

$\phi_3 = 0.45$
$\phi_2 + \phi_3 = 0.88$
$|\phi_2 - \phi_3| = 0.02$

TABLE 9
[Embodiment 9]
NA = 0.47  f = 1.0  WD = 0.54  β = −0.23

| | | radius of curvature | | axial distance | | refractive index |
|---|---|---|---|---|---|---|
| G | { | $r_{g1}$ ∞ | $d_{g1}$ | 1.200 | $n_g$ | 1.51078 |
|   |   | $r_{g2}$ ∞ | $d_{g2}$ | 1.000 | | |
| $L_1$ | { | $r_1^*$ 2.032 | $d_1$ | 0.778 | $n_1$ | 1.48366 |
|       |   | $r_2$ −1.188 | $d_2$ | 0.340 | | |
| $L_2$ | { | $r_3$ 1.080 | $d_3$ | 0.344 | $n_2$ | 1.48366 |
|       |   | $r_4$ −2.159 | $d_4$ | 0.540 | | |
| P | { | $r_{p1}$ ∞ | $d_p$ | 0.240 | $n_p$ | 1.57147 |
|   |   | $r_{p2}$ ∞ | | | | |

$\epsilon = 1.0$
aspherical surface coefficients
$C_1 = 0.0,$  $C_2 =$  $C_3 = -0.14273,$
$C_4 = -0.72364 \times 10^{-1},$ $-0.32925,$ $C_5 = 0.13826 \times 10^{-2}$
$f_1/f_2 = 1.09$
$d_1/f = 0.78$ $$\frac{r_1 + r_2}{r_1 - r_2} = 0.26$$

$\phi_3 = 0.45$
$\phi_2 + \phi_3 = 0.86$
$|\phi_2 - \phi_3| = 0.04$

TABLE 10
[Embodiment 10]
NA = 0.47  f = 1.0  WD = 0.47  β = −0.23

| | | radius of curvature | | axial distance | | refractive index |
|---|---|---|---|---|---|---|
| G | { | $r_{g1}$ ∞ | $d_{g1}$ | 1.200 | $n_g$ | 1.51078 |
|   |   | $r_{g2}$ ∞ | $d_{g2}$ | 1.000 | | |
| $L_1$ | { | $r_1^*$ 1.642 | $d_1$ | 0.530 | $n_1$ | 1.48366 |
|       |   | $r_2$ −1.107 | $d_2$ | 0.440 | | |
| $L_2$ | { | $r_3$ 1.707 | $d_3$ | 0.346 | $n_2$ | 1.48366 |
|       |   | $r_4$ −1.302 | $d_4$ | 0.470 | | |
| P | { | $r_{p1}$ ∞ | $d_p$ | 0.240 | $n_p$ | 1.57147 |
|   |   | $r_{p2}$ ∞ | | | | |

$\epsilon = 1.0$
aspherical surface coefficients
$C_1 = 0.0,$  $C_2 =$  $C_3 = -0.15543,$
$C_4 = -0.73095 \times 10^{-1},$ $-0.42504,$ $C_5 = 0.11456 \times 10^{-2}$
$f_1/f_2 = 0.92$
$d_1/f = 0.53$ $$\frac{r_1 + r_2}{r_1 - r_2} = 0.19$$

$\phi_3 = 0.28$

TABLE 10-continued
[Embodiment 10]
NA = 0.47  f = 1.0  WD = 0.47  β = −0.23

$\phi_3 + \phi_3 = 0.72$
$|\phi_2 - \phi_3| = 0.16$

TABLE 11
[Embodiment 11]
NA = 0.47  f = 1.0  WD = 0.58  β = −0.23

| | | radius of curvature | | axial distance | | refractive index |
|---|---|---|---|---|---|---|
| G | { | $r_{g1}$ ∞ | $d_{g1}$ | 1.200 | $n_g$ | 1.51078 |
|   |   | $r_{g2}$ ∞ | $d_{g2}$ | 1.000 | | |
| $L_1$ | { | $r_1^*$ 1.889 | $d_1$ | 0.760 | $n_1$ | 1.48366 |
|       |   | $r_2$ −1.514 | $d_2$ | 0.330 | | |
| $L_2$ | { | $r_3$ 1.632 | $d_3$ | 0.390 | $n_2$ | 1.78458 |
|       |   | $r_4$ −2.959 | $d_4$ | 0.580 | | |
| P | { | $r_{p1}$ ∞ | $d_p$ | 0.240 | $n_p$ | 1.57147 |
|   |   | $r_{p2}$ ∞ | | | | |

$\epsilon = 1.0$
aspherical surface coefficients
$C_1 = 0.0,$  $C_2 =$  $C_3 = -0.73128 \times 10^{-1},$
$C_4 = -0.76365 \times 10^{-1},$ $-0.27612,$ $C_5 = 0.11852 \times 10^{-2}$
$f_1/f_2 = 1.35$
$d_1/f = 0.76$ $$\frac{r_1 + r_2}{r_1 - r_2} = 0.11$$

$\phi_3 = 0.48$
$\phi_2 + \phi_3 = 0.80$
$|\phi_2 - \phi_3| = 0.16$

TABLE 12
[Embodiment 12]
NA = 0.47  f = 1.0  WD = 0.44  β = −0.23

| | | radius of curvature | | axial distance | | refractive index |
|---|---|---|---|---|---|---|
| G | { | $r_{g1}$ ∞ | $d_{g1}$ | 1.200 | $n_g$ | 1.51078 |
|   |   | $r_{g2}$ ∞ | $d_{g2}$ | 1.000 | | |
| $L_1$ | { | $r_1^*$ 1.598 | $d_1$ | 0.400 | $n_1$ | 1.51078 |
|       |   | $r_2$ −1.465 | $d_2$ | 0.660 | | |
| $L_2$ | { | $r_3$ 1.637 | $d_3$ | 0.260 | $n_2$ | 1.78458 |
|       |   | $r_4$ −2.308 | $d_4$ | 0.440 | | |
| P | { | $r_{p1}$ ∞ | $d_p$ | 0.240 | $n_p$ | 1.57147 |
|   |   | $r_{p2}$ ∞ | | | | |

$\epsilon = 1.0$
aspherical surface coefficients
$C_1 = 0.0,$  $C_2 =$  $C_3 = -0.36326 \times 10^{-1},$
$C_4 = -0.77710 \times 10^{-1},$ $-0.28974,$ $C_5 = 0.11074 \times 10^{-2}$
$f_1/f_2 = 1.25$
$d_1/f = 0.40$ $$\frac{r_1 + r_2}{r_1 - r_2} = 0.04$$

$\phi_3 = 0.48$
$\phi_2 + \phi_3 = 0.83$

TABLE 12-continued

[Embodiment 12]
NA = 0.47  f = 1.0  WD = 0.44  β = −0.23

$|\phi_2 - \phi_3| = 0.13$

TABLE 13

[Embodiment 13]
NA = 0.47  f = 1.0  WD = 0.48  β = −0.30

| | | radius of curvature | | axial distance | | refractive index |
|---|---|---|---|---|---|---|
| G | { | $r_{g1}$ ∞ | $d_{g1}$ | 1.200 | $n_g$ | 1.51078 |
| | | $r_{g2}$ ∞ | $d_{g2}$ | 1.000 | | |
| $L_1$ | { | $r_1$ 2.204 | $d_1$ | 0.640 | $n_1$ | 1.78458 |
| | | $r_2$ −1.956 | $d_2$ | 0.560 | | |
| $L_2$ | { | $r_3$ 1.998 | $d_3$ | 0.270 | $n_2$ | 1.78458 |
| | | $r_4$ −2.512 | $d_4$ | 0.480 | | |
| P | { | $r_{p1}$ ∞ | $d_p$ | 0.240 | $n_p$ | 1.57147 |
| | | $r_{p2}$ ∞ | | | | |

$\epsilon = 1.0$
aspherical surface coefficients
$C_1 = 0.0$, $C_2 = -0.16855$, $C_3 = -0.17197 \times 10^{-1}$,
$C_4 = -0.30416 \times 10^{-1}$, $C_5 = 0.29400 \times 10^{-2}$
$f_1/f_2 = 0.97$
$d_1/f = 0.64$ $$\frac{r_1 + r_2}{r_1 - r_2} = 0.06$$

$\phi_3 = 0.39$
$\phi_2 + \phi_3 = 0.79$
$|\phi_2 - \phi_3| = 0.01$

TABLE 14

[Embodiment 14]
NA = 0.47  f = 1.0  WD = 0.73  β = −0.40

| | | radius of curvature | | axial distance | | refractive index |
|---|---|---|---|---|---|---|
| G | { | $r_{g1}$ ∞ | $d_{g1}$ | 1.200 | $n_g$ | 1.51078 |
| | | $r_{g2}$ ∞ | $d_{g2}$ | 1.000 | | |
| $L_1$ | { | $r_1^*$ 2.755 | $d_1$ | 0.830 | $n_1$ | 1.66175 |
| | | $r_2$ −1.520 | $d_2$ | 0.390 | | |
| $L_2$ | { | $r_3$ 1.831 | $d_3$ | 0.300 | $n_2$ | 1.73269 |
| | | $r_4$ −2.915 | $d_4$ | 0.732 | | |
| P | { | $r_{p1}$ ∞ | $d_p$ | 0.240 | $n_p$ | 1.57147 |
| | | $r_{p2}$ ∞ | | | | |

$\epsilon = 1.0$
aspherical surface coefficients
$C_1 = 0.0$, $C_2 = -0.24769$, $C_3 = -0.22302 \times 10^{-2}$,
$C_4 = -0.82317 \times 10^{-1}$, $C_5 = 0.11152 \times 10^{-2}$
$f_1/f_2 = 1.02$
$d_1/f = 0.83$ $$\frac{r_1 + r_2}{r_1 - r_2} = 0.29$$

$\phi_3 = 0.40$
$\phi_2 + \phi_3 = 0.84$
$|\phi_2 - \phi_3| = 0.04$

TABLE 15

[Embodiment 15]
NA = 0.47  f = 1.0  WD = 0.76  β = −0.45

| | | radius of curvature | | axial distance | | refractive index |
|---|---|---|---|---|---|---|
| G | { | $r_{g1}$ ∞ | $d_{g1}$ | 1.200 | $n_g$ | 1.51078 |
| | | $r_{g2}$ ∞ | $d_{g2}$ | 1.000 | | |
| $L_1$ | { | $r_1^*$ 3.609 | $d_1$ | 0.770 | $n_1$ | 1.79132 |
| | | $r_2$ −1.552 | $d_2$ | 0.450 | | |
| $L_2$ | { | $r_3$ 2.953 | $d_3$ | 0.290 | $n_2$ | 1.79132 |
| | | $r_4$ −2.316 | $d_4$ | 0.760 | | |
| P | { | $r_{p1}$ ∞ | $d_p$ | 0.240 | $n_p$ | 1.57147 |
| | | $r_{p2}$ ∞ | | | | |

$\epsilon = 1.0$
aspherical surface coefficients
$C_1 = 0.0$, $C_2 = -0.23581$, $C_3 = 0.10044 \times 10^{-2}$,
$C_4 = -0.47100 \times 10^{-1}$, $C_5 = -0.73097 \times 10^{-1}$
$f_1/f_2 = 0.87$
$d_1/f = 0.77$ $$\frac{r_1 + r_2}{r_1 - r_2} = 0.40$$

$\phi_3 = 0.27$
$\phi_2 + \phi_3 = 0.78$
$|\phi_2 - \phi_3| = 0.24$

TABLE 16

[Embodiment 16]
NA = 0.47  f = 1.0  WD = 0.40  β = −0.23

| | | radius of curvature | | axial distance | | refractive index |
|---|---|---|---|---|---|---|
| G | { | $r_{g1}$ ∞ | $d_{g1}$ | 1.200 | $n_g$ | 1.51078 |
| | | $r_{g2}$ ∞ | $d_{g2}$ | 1.000 | | |
| $L_1$ | { | $r_1^*$ 1.843 | $d_{1a}$ | 0.0006 | $n_1'$ | 1.51539 |
| | | $r_1'$ 1.843 | $d_{1b}$ | 0.676 | $n_1$ | 1.78458 |
| | | $r_2$ −2.817 | $d_2$ | 0.538 | | |
| $L_2$ | { | $r_3$ 1.681 | $d_3$ | 0.290 | $n_2$ | 1.78458 |
| | | $r_4$ −4.519 | $d_4$ | 0.400 | | |
| P | { | $r_{p1}$ ∞ | $d_p$ | 0.240 | $n_p$ | 1.57147 |
| | | $r_{p2}$ ∞ | | | | |

$\epsilon = 1.0$
aspherical surface coefficients
$C_1 = 0.0$, $C_2 = -0.18873$, $C_3 = -0.42903 \times 10^{-1}$,
$C_4 = -00.30672 \times 10^{-1}$, $C_5 = 0.29445 \times 10^{-2}$
$f_1/f_2 = 0.95$
$d_1/f = (d_{1a} = d_{1b})/f = 0.68$ $$\frac{r_1 + r_2}{r_1 - r_2} = -0.21$$

$\phi_3 = 0.47$
$\phi_2 + \phi_3 = 0.75$
$|\phi_2 - \phi_3| = 0.19$

TABLE 17

[Embodiment 17]
NA = 0.47  f = 1.0  WD = 0.36  β = −0.23 radius of     axial      refractive

TABLE 17-continued

[Embodiment 17]
NA = 0.47  f = 1.0  WD = 0.36  β = −0.23

| | | curvature | | distance | | index |
|---|---|---|---|---|---|---|
| G | $r_{g1}$ | ∞ | $d_{g1}$ | 1.200 | $N_g$ | 1.51078 |
| | $r_{g2}$ | ∞ | $d_{g2}$ | 1.000 | | |
| $L_1$ | $r_1$ | 1.255 | $d_1$ | 0.940 | $N_1$ | 1.76492 |
| | $r_2$* | 13.527 | | | | |
| | | | $d_2$ | 0.347 | | |
| $L_2$ | $r_3$ | 1.217 | $d_3$ | 0.380 | $N_2$ | 1.76492 |
| | $r_4$ | −1.724 | | | | |
| | | | $d_4$ | 0.360 | | |
| P | $r_{p1}$ | ∞ | $d_p$ | 0.240 | $N_p$ | 1.57147 |
| | $r_{p2}$ | ∞ | | | | |

ε = 0.03563
aspherical surface coefficients $C_1 = 0.0$   $C_2 = 0.38111$   $C_3 = 0.14592$
$C_4 = 0.56315$   $C_5 = 0.21450 \times 10^1$
$d_1/f = 0.94$
$d_2/d_1 = 0.37$
$f \cdot (\phi_1 + \phi_4) = 1.05$
$f \cdot \phi_4 = 0.44$

TABLE 18

[Embodiment 18]
NA = 0.47  f = 1.0  WD = 0.42  β = −0.23

| | | radius of curvature | | axial distance | | refractive index |
|---|---|---|---|---|---|---|
| G | $r_{g1}$ | ∞ | $d_{g1}$ | 1.200 | $N_g$ | 1.51078 |
| | $r_{g2}$ | ∞ | $d_{g2}$ | 1.000 | | |
| $L_1$ | $r_1$ | 1.206 | $d_1$ | 0.756 | $N_1$ | 1.76492 |
| | $r_2$* | 9.184 | | | | |
| | | | $d_2$ | 0.347 | | |
| $L_2$ | $r_3$ | 1.391 | $d_3$ | 0.380 | $N_2$ | 1.76492 |
| | $r_4$ | −1.942 | | | | |
| | | | $d_4$ | 0.420 | | |
| P | $r_{p1}$ | ∞ | $d_p$ | 0.240 | $N_p$ | 1.57147 |
| | $r_{p2}$ | ∞ | | | | |

ε = 0.03562
aspherical surface coefficients $C_1 = 0.0$   $C_2 = 0.32778$   $C_3 = 0.75377 \times 10^{-1}$
$C_4 = 0.32070$   $C_5 = 0.10427 \times 10^1$
$d_1/f = 0.756$
$d_2/d_1 = 0.46$
$f \cdot (\phi_1 + \phi_4) = 1.02$
$f \cdot \phi_4 = 0.39$

TABLE 19

[Embodiment 19]
NA = 0.47  f = 1.0  WD = 0.264  β = −0.23

| | | radius of curvature | | axial distance | | refractive index |
|---|---|---|---|---|---|---|
| G | $r_{g1}$ | ∞ | $d_{g1}$ | 1.200 | $N_g$ | 1.51078 |
| | $r_{g2}$ | ∞ | $d_{g2}$ | 1.000 | | |
| $L_1$ | $r_1$ | 1.367 | $d_1$ | 1.220 | $N_1$ | 1.76492 |
| | $r_2$* | 264.760 | | | | |
| | | | $d_2$ | 0.317 | | |
| $L_2$ | $r_3$ | 0.924 | $d_3$ | 0.481 | $N_2$ | 1.76492 |
| | $r_4$ | −1.764 | | | | |
| | | | $d_4$ | 0.264 | | |

TABLE 19-continued

[Embodiment 19]
NA = 0.47  f = 1.0  WD = 0.264  β = −0.23

| | | | | | | |
|---|---|---|---|---|---|---|
| P | $r_{p1}$ | ∞ | $d_p$ | 0.240 | $N_p$ | 1.57147 |
| | $r_{p2}$ | ∞ | | | | |

ε = 0.03563
aspherical surface coefficients $C_1 = 0.0$   $C_2 = 0.36364$   $C_3 = 0.26455$
$C_4 = 0.58608$   $C_5 = 0.21457 \times 10^1$
$d_1/f = 1.22$
$d_2/d_1 = 0.26$
$f \cdot (\phi_1 + \phi_4) = 0.99$
$f \cdot \phi_4 = 0.43$

TABLE 20

[Embodiment 20]
NA = 0.47  f = 1.0  WD = 0.492  β = −0.23

| | | radius of curvature | | axial distance | | refractive index |
|---|---|---|---|---|---|---|
| G | $r_{g1}$ | ∞ | $d_{g1}$ | 1.200 | $N_g$ | 1.51078 |
| | $r_{g2}$ | ∞ | $d_{g2}$ | 1.000 | | |
| $L_1$ | $r_1$ | 1.521 | $d_1$ | 0.500 | $N_1$ | 1.76492 |
| | $r_2$* | −10.770 | | | | |
| | | | $d_2$ | 0.420 | | |
| $L_2$ | $r_3$ | 1.574 | $d_3$ | 0.420 | $N_2$ | 1.76492 |
| | $r_4$ | −2.360 | | | | |
| | | | $d_4$ | 0.492 | | |
| P | $r_{p1}$ | ∞ | $d_p$ | 0.240 | $N_p$ | 1.57147 |
| | $r_{p2}$ | ∞ | | | | |

ε = 0.03562
aspherical surface coefficients $C_1 = 0.0$   $C_2 = 0.16157$   $C_3 = 0.18676$
$C_4 = -0.58918$   $C_5 = 0.10081 \times 10^1$
$d_1/f = 0.50$
$d_2/d_1 = 0.84$
$f \cdot (\phi_1 + \phi_4) = 0.82$
$f \cdot \phi_4 = 0.32$

TABLE 21

[Embodiment 21]
NA = 0.47  f = 1.0  WD = 0.388  β = −0.23

| | | radius of curvature | | axial distance | | refractive index |
|---|---|---|---|---|---|---|
| G | $r_{g1}$ | ∞ | $d_{g1}$ | 1.200 | $N_g$ | 1.51078 |
| | $r_{g2}$ | ∞ | $d_{g2}$ | 1.000 | | |
| $L_1$ | $r_1$ | 1.206 | $d_1$ | 0.863 | $N_1$ | 1.76492 |
| | $r_2$* | 2.312 | | | | |
| | | | $d_2$ | 0.140 | | |
| $L_2$ | $r_3$ | 1.053 | $d_3$ | 0.658 | $N_2$ | 1.76492 |
| | $r_4$ | −1.770 | | | | |
| | | | $d_4$ | 0.388 | | |
| P | $r_{p1}$ | ∞ | $d_p$ | 0.240 | $N_p$ | 1.57147 |
| | $r_{p2}$ | ∞ | | | | |

ε = 0.03627
aspherical surface coefficients $C_1 = 0.0$   $C_2 = 0.36198$   $C_3 = 0.30250$
$C_4 = 0.32240$   $C_5 = 0.21385 \times 10^1$
$d_1/f = 0.86$
$d_2/d_1 = 0.16$
$f \cdot (\phi_1 + \phi_4) = 1.06$
$f \cdot \phi_4 = 0.43$

TABLE 22

[Embodiment 22]
NA = 0.47  f = 1.0  WD = 0.478  β = −0.23

| | | radius of curvature | axial distance | | refractive index | |
|---|---|---|---|---|---|---|
| G | { | $r_{g1}$ ∞ | $d_{g1}$ | 1.200 | $N_g$ | 1.51078 |
| | | $r_{g2}$ ∞ | $d_{g2}$ | 1.000 | | |
| $L_1$ | { | $r_1$ 1.510 | $d_1$ | 1.000 | $N_1$ | 1.76492 |
| | | $r_2$* 1.849 | $d_2$ | 0.020 | | |
| $L_2$ | { | $r_3$ 0.876 | $d_3$ | 0.657 | $N_2$ | 1.76492 |
| | | $r_4$ −1.807 | $d_4$ | 0.478 | | |
| P | { | $r_{p1}$ ∞ | $d_p$ | 0.240 | $N_p$ | 1.57147 |
| | | $r_{p2}$ ∞ | | | | |

$\epsilon = 0.03669$
aspherical surface coefficients $C_1 = 0.0$    $C_2 = 0.35427$    $C_3 = 0.42634$
$C_4 = 0.19830$                   $C_5 = 0.21349 \times 10^1$
$d_1/f = 1.00$
$D_2/d_1 = 0.02$
$f \cdot (\phi_1 + \phi_4) = 0.93$
$f \cdot \phi_4 = 0.42$

TABLE 23

[Embodiment 23]
NA = 0.47  f = 1.0  WD = 0.206  β = −0.23

| | | radius of curvature | axial distance | | refractive index | |
|---|---|---|---|---|---|---|
| G | { | $r_{g1}$ ∞ | $d_{g1}$ | 1.200 | $N_g$ | 1.51078 |
| | | $r_{g2}$ ∞ | $d_{g2}$ | 1.000 | | |
| $L_1$ | { | $r_1$ 1.232 | $d_1$ | 0.940 | $N_1$ | 1.76492 |
| | | $r_2$* −11.476 | $d_2$ | 0.346 | | |
| $L_2$ | { | $r_3$ 1.206 | $d_3$ | 0.580 | $N_2$ | 1.76492 |
| | | $r_4$ −1.757 | $d_4$ | 0.206 | | |
| P | { | $r_{p1}$ ∞ | $d_p$ | 0.240 | $N_p$ | 1.57147 |
| | | $r_{p2}$ ∞ | | | | |

$\epsilon = 0.03563$
aspherical surface coefficients $C_1 = 0.0$    $C_2 = 0.31974$    $C_3 = -0.12133$
$C_4 = 0.61135$                   $C_5 = 0.21464 \times 10^1$
$d_1/f = 0.94$
$d_2/d_1 = 0.37$
$f \cdot (\phi_1 + \phi_4) = 1.06$
$f \cdot \phi_4 = 0.44$

TABLE 24

[Embodiment 24]
NA = 0.47  f = 1.0  WD = 0.748  β = −0.23

| | | radius of curvature | axial distance | | refractive index | |
|---|---|---|---|---|---|---|
| G | { | $r_{g1}$ ∞ | $d_{g1}$ | 1.200 | $N_g$ | 1.51078 |
| | | $r_{g2}$ ∞ | $d_{g2}$ | 1.000 | | |
| $L_1$ | { | $r_1$ 4.000 | $d_1$ | 0.988 | $N_1$ | 1.76492 |
| | | $r_2$* −3.609 | $d_2$ | 0.302 | | |
| $L_2$ | { | $r_3$ 4.649 | $d_3$ | 0.376 | $N_2$ | 1.76492 |
| | | $r_4$ −1.043 | $d_4$ | 0.748 | | |
| P | { | $r_{p1}$ ∞ | $d_p$ | 0.240 | $N_p$ | 1.57147 |
| | | $r_{p2}$ ∞ | | | | |

$\epsilon = 0.03563$
aspherical surface coefficients $C_1 = 0.0$    $C_2 = 0.41177$    $C_3 = 0.36202$
$C_4 = 0.88670$                   $C_5 = 0.32104 \times 10^1$
$d_1/f = 0.99$
$d_2/d_1 = 0.31$
$f \cdot (\phi_1 + \phi_4) = 0.92$
$f \cdot \phi_4 = 0.73$

TABLE 25

[Embodiment 25]
NA = 0.47  f = 1.0  WD = 0.624  β = −0.23

| | | radius of curvature | axial distance | | refractive index | |
|---|---|---|---|---|---|---|
| G | { | $r_{g1}$ ∞ | $d_{g1}$ | 1.200 | $N_g$ | 1.51078 |
| | | $r_{g2}$ ∞ | $d_{g2}$ | 1.000 | | |
| $L_1$ | { | $r_1$ 2.402 | $d_1$ | 0.988 | $N_1$ | 1.76492 |
| | | $r_2$* −3.718 | $d_2$ | 0.302 | | |
| $L_2$ | { | $r_3$ 4.513 | $d_3$ | 0.376 | $N_2$ | 1.76492 |
| | | $r_4$ −1.050 | $d_4$ | 0.624 | | |
| P | { | $r_{p1}$ ∞ | $d_p$ | 0.240 | $N_p$ | 1.57147 |
| | | $r_{p2}$ ∞ | | | | |

$\epsilon = 0.03563$
aspherical surface coefficients $C_1 = 0.0$    $C_2 = 0.41684$    $C_3 = 0.28059$
$C_4 = 0.94603$                   $C_5 = 0.32636 \times 10^1$
$d_1/f = 0.99$
$d_2/d_1 = 0.31$
$f \cdot (\phi_1 + \phi_4) = 1.05$
$f \cdot \phi_4 = 0.73$

TABLE 26

[Embodiment 26]
NA = 0.47  f = 1.0  WD = 0.468  β = −0.23

| | | radius of curvature | axial distance | | refractive index | |
|---|---|---|---|---|---|---|
| G | { | $r_{g1}$ ∞ | $d_{g1}$ | 1.200 | $N_g$ | 1.51098 |
| | | $r_{g2}$ ∞ | $d_{g2}$ | 1.000 | | |
| $L_1$ | { | $r_1$ 0.937 | $d_1$ | 0.756 | $N_1$ | 1.48366 |
| | | $r_2$* 41.264 | $d_2$ | 0.335 | | |
| $L_2$ | { | $r_3$ 1.426 | $d_3$ | 0.387 | $N_2$ | 1.76492 |
| | | $r_4$ −1.579 | $d_4$ | 0.468 | | |
| P | { | $r_{p1}$ ∞ | $d_p$ | 0.240 | $N_p$ | 1.57147 |
| | | $r_{p2}$ ∞ | | | | |

$\epsilon = 0.03562$
aspherical surface coefficients $C_1 = 0.0$   $C_2 = 0.69239$    $C_3 = 0.18423$
$C_4 = 0.23118 \times 10^1$      $C_5 = 0.11321 \times 10^1$
$d_1/f = 0.76$
$d_2/d_1 = 0.44$
$f \cdot (\phi_1 + \phi_4) = 1.00$

TABLE 26-continued

[Embodiment 26]
NA = 0.47  f = 1.0  WD = 0.468  β = −0.23 f · φ$_4$ = 0.48

TABLE 27

[Embodiment 27]
NA = 0.47  f = 1.0  WD = 0.36  β = −0.23

|   |   | radius of curvature |   | axial distance |   | refractive index |
|---|---|---|---|---|---|---|
| G | { | r$_{g1}$ ∞ | d$_{g1}$ | 1.200 | N$_g$ | 1.51078 |
|   |   | r$_{g2}$ ∞ | d$_{g2}$ | 1.000 |   |   |
| L$_1$ | { | r$_1$ 0.828 | d$_1$ | 0.760 | N$_1$ | 1.48366 |
|   |   | r$_2$* −9.996 | d$_2$ | 0.307 |   |   |
| L$_2$ | { | r$_3$ 0.833 | d$_3$ | 0.368 | N$_2$ | 1.48366 |
|   |   | r$_4$ −1.609 | d$_4$ | 0.360 |   |   |
| P | { | r$_{p1}$ ∞ | d$_p$ | 0.240 | N$_p$ | 1.57147 |
|   |   | r$_{p2}$ ∞ |   |   |   |   |

ε = 0.03562
aspherical surface coefficients

C$_1$ = 0.0  C$_2$ = 0.70769  C$_3$ = 0.24786
C$_4$ = 0.24631 × 10$^1$  C$_5$ = 0.11423 × 10$^1$
d$_1$/f = 0.76
d$_2$/d$_1$ = 0.40
f · (φ$_1$ + φ$_4$) = 0.88
f · φ$_4$ = 0.30

TABLE 28

[Embodiment 28]
NA = 0.47  f = 1.0  WD = 0.478  β = −0.23

|   |   | radius of curvature |   | axial distance |   | refractive index |
|---|---|---|---|---|---|---|
| G | { | r$_{g1}$ ∞ | d$_{g1}$ | 1.200 | N$_g$ | 1.51078 |
|   |   | r$_{g2}$ ∞ | d$_{g2}$ | 1.000 |   |   |
| L$_1$ | { | r$_1$ 1.024 | d$_1$ | 0.756 | N$_1$ | 1.51078 |
|   |   | r$_2$* −20.573 | d$_2$ | 0.335 |   |   |
| L$_2$ | { | r$_3$ 1.521 | d$_3$ | 0.387 | N$_2$ | 1.76492 |
|   |   | r$_4$ −1.590 | d$_4$ | 0.478 |   |   |
| P | { | r$_{p1}$ ∞ | d$_p$ | 0.240 | N$_p$ | 1.57147 |
|   |   | r$_{p2}$ ∞ |   |   |   |   |

ε = 0.03562
aspherical surface coefficients

C$_1$ = 0.0  C$_2$ = 0.58336  C$_3$ = 0.96587 × 10$^{-1}$
C$_4$ = 0.14862 × 10$^1$  C$_5$ = 0.10923 × 10$^1$
d$_1$/f = 0.76
d$_2$/d$_1$ = 0.44
f · (φ$_1$ + φ$_4$) = 0.98
f · φ$_4$ = 0.48

TABLE 29

[Embodiment 29]
NA = 0.47  f = 1.0  WD = 0.466  β = −0.23

|   |   | radius of curvature |   | axial distance |   | refractive index |
|---|---|---|---|---|---|---|
| G | { | r$_{g1}$ ∞ | d$_{g1}$ | 1.200 | N$_g$ | 1.51078 |
|   |   | r$_{g2}$ ∞ | d$_{g2}$ | 1.000 |   |   |

TABLE 29-continued

[Embodiment 29]
NA = 0.47  f = 1.0  WD = 0.466  β = −0.23

|   |   |   |   |   |   |   |
|---|---|---|---|---|---|---|
| L$_1$ | { | r$_1$ 0.987 | d$_{1a}$ | 0.750 | N$_{1a}$ | 1.51078 |
|   |   | r$_{2'}$ −437.002 | d$_{1b}$ | 0.006 | N$_{1b}$ | 1.51539 |
|   |   | r$_2$* −437.002 | d$_2$ | 0.335 |   |   |
| L$_2$ | { | r$_3$ 1.457 | d$_3$ | 0.387 | N$_2$ | 1.76492 |
|   |   | r$_4$ −1.615 | d$_4$ | 0.466 |   |   |
| P | { | r$_{p1}$ ∞ | d$_p$ | 0.240 | N$_p$ | 1.57147 |
|   |   | r$_{p2}$ ∞ |   |   |   |   |

ε = 0.03562
aspherical surface coefficients

C$_1$ = 0.0  C$_2$ = 0.60626  C$_3$ = 0.11403
C$_4$ = 0.17038 × 10$^1$  C$_5$ = 0.11046 × 10$^1$
d$_1$/f = 0.75
d$_2$/d$_1$ = 0.45
f · (φ$_1$ + φ$_4$) = 0.99
f · φ$_4$ = 0.47

TABLE 30

[Embodiment 30]
NA = 0.47  f = 1.0  WD = 0.283  β = −0.23

|   |   | radius of curvature |   | axial distance |   | refractive index |
|---|---|---|---|---|---|---|
| G | { | r$_{g1}$ ∞ | d$_{g1}$ | 1.200 | N$_g$ | 1.51078 |
|   |   | r$_{g2}$ ∞ | d$_{g2}$ | 1.000 |   |   |
| L$_1$ | { | r$_1$ 0.909 | d$_1$ | 0.756 | N$_1$ | 1.76492 |
|   |   | r$_2$* 2.579 | d$_2$ | 0.340 |   |   |
| L$_2$ | { | r$_3$ 1.029 | d$_3$ | 0.391 | N$_2$ | 1.76492 |
|   |   | r$_4$ −4.147 | d$_4$ | 0.283 |   |   |
| P | { | r$_{p1}$ ∞ | d$_p$ | 0.240 | N$_p$ | 1.57147 |
|   |   | r$_{p2}$ ∞ |   |   |   |   |

ε = 0.03571
aspherical surface coefficients

C$_1$ = 0.0  C$_2$ = 0.53477  C$_3$ = 0.34228
C$_4$ = 0.16180 × 10$^1$  C$_5$ = 0.10883 × 10$^1$
d$_1$/f = 0.76
d$_2$/d$_1$ = 0.18
f · (φ$_1$ + φ$_4$) = 1.02
f · φ$_4$ = 0.18

TABLE 31

[Embodiment 31]
NA = 0.47  f = 1.0  WD = 0.674  β = −0.35

|   |   | radius of curvature |   | axial distance |   | refractive index |
|---|---|---|---|---|---|---|
| G | { | r$_{g1}$ ∞ | d$_{g1}$ | 1.200 | N$_g$ | 1.51078 |
|   |   | r$_{g2}$ ∞ | d$_{g2}$ | 1.000 |   |   |
| L$_1$ | { | r$_1$ 1.648 | d$_1$ | 0.660 | N$_1$ | 1.76492 |
|   |   | r$_2$* −6.626 | d$_2$ | 0.336 |   |   |
| L$_2$ | { | r$_3$ 2.572 | d$_3$ | 0.380 | N$_2$ | 1.76492 |
|   |   | r$_4$ −1.457 | d$_4$ | 0.674 |   |   |
| P | { | r$_{p1}$ ∞ | d$_p$ | 0.240 | N$_p$ | 1.57147 |
|   |   | r$_{p2}$ ∞ |   |   |   |   |

TABLE 31-continued

[Embodiment 31]
NA = 0.47   f = 1.0   WD = 0.674   β = −0.35

$\epsilon = 0.03562$
aspherical surface coefficients $C_1 = 0.0$   $C_2 = 0.27689$   $C_3 = 0.20247$   $C_4 = -0.22495$
$C_5 = 0.10345 \times 10^1$
$d_1/f = 0.66$
$d_2/d_1 = 0.51$
$f \cdot (\phi_1 + \phi_4) = 0.99$
$f \cdot \phi_4 = 0.53$

TABLE 32

[Embodiment 32]
NA = 0.47   f = 1.0   WD = 0.774   β = −0.45

| | | radius of curvature | axial distance | | refractive index |
|---|---|---|---|---|---|
| G | $r_{g1}$ | ∞ | $d_{g1}$ 1.200 | $N_g$ | 1.51078 |
| | $r_{g2}$ | ∞ | $d_{g2}$ 1.000 | | |
| $L_1$ | $r_1$ | 1.762 | $d_1$ 0.660 | $N_1$ | 1.76492 |
| | $r_2$* | −4.248 | $d_2$ 0.337 | | |
| $L_2$ | $r_3$ | 2.927 | $d_3$ 0.379 | $N_2$ | 1.76492 |
| | $r_4$ | −1.479 | $d_4$ 0.774 | | |
| P | $r_{p1}$ | ∞ | $d_p$ 0.240 | $N_p$ | 1.57147 |
| | $r_{p2}$ | ∞ | | | |

$\epsilon = 0.03562$
aspherical surface coefficients $C_1 = 0.0$   $C_2 = 0.25724$   $C_3 = 0.23282$   $C_4 = -0.42688$
$C_5 = 0.10254 \times 10^1$
$d_1/f = 0.66$
$d_2/d_1 = 0.52$
$f \cdot (\phi_1 + \phi_4) = 0.95$
$f \cdot \phi_4 = 0.52$

TABLE 33

[Embodiment 33]
NA = 0.47   f = 1.0   WD = 0.416   β = −0.15

| | | radius of curvature | axial distance | | refractive index |
|---|---|---|---|---|---|
| G | $r_{g1}$ | ∞ | $d_{g1}$ 1.200 | $N_g$ | 1.51078 |
| | $r_{g2}$ | ∞ | $d_{g2}$ 1.000 | | |
| $L_1$ | $r_1$ | 1.294 | $d_1$ 0.602 | $N_1$ | 1.76492 |
| | $r_2$* | 15.142 | $d_2$ 0.351 | | |
| $L_2$ | $r_3$ | 1.769 | $d_3$ 0.403 | $N_2$ | 1.76492 |
| | $r_4$ | −1.709 | $d_4$ 0.416 | | |
| P | $r_{p1}$ | ∞ | $d_p$ 0.240 | $N_p$ | 1.57147 |
| | $r_{p2}$ | ∞ | | | |

$\epsilon = 0.03562$
aspherical surface coefficients $C_1 = 0.1$   $C_2 = 0.25992$   $C_3 = 0.99020 \times 10^{-1}$
$C_4 = 0.47836 \times 10^{-1}$   $C_5 = 0.10387 \times 10^1$
$d_1/f = 0.60$
$d_2/d_1 = 0.58$
$f \cdot (\phi_1 + \phi_4) = 1.04$
$f \cdot \phi_4 = 0.45$

TABLE 34

[Embodiment 34]
NA = 0.47   f = 1.0   WD = 0.432   β = −0.15

| | | radius of curvature | axial distance | | refractive index |
|---|---|---|---|---|---|
| G | $r_{g1}$ | ∞ | $d_{g1}$ 1.200 | $N_g$ | 1.51078 |
| | $r_{g2}$ | ∞ | $d_{g2}$ 1.000 | | |
| $L_1$ | $r_1$ | 1.422 | $d_1$ 0.500 | $N_1$ | 2.00000 |
| | $r_2$* | 6.910 | $d_2$ 0.351 | | |
| $L_2$ | $r_3$ | 2.122 | $d_3$ 0.403 | $N_2$ | 1.76492 |
| | $r_4$ | −1.724 | $d_4$ 0.432 | | |
| P | $r_{p1}$ | ∞ | $d_p$ 0.240 | $N_p$ | 1.57147 |
| | $r_{p2}$ | ∞ | | | |

$\epsilon = 0.03565$
aspherical surface coefficients $C_1 = 0.0$   $C_2 = 0.17123$   $C_3 = 0.11894$   $C_4 = -0.24577$
$C_5 = 0.10316 \times 10^1$
$d_1/f = 0.50$
$d_2/d_1 = 0.70$
$f \cdot (\phi_1 + 100_4) = 1.15$
$f \cdot \phi_4 = 0.44$

What is claimed is:

1. An objective lens system for optical recording type disks, comprising from a light source side to a disk side; a first lens element of a positive refractive power; and a second lens element of a positive refractive power, wherein the light source side surface of the first lens element is aspherical while all of the other surfaces are spheric, and wherein the lens system fulfills the following conditions:

$-\frac{1}{2} < \beta < -\frac{1}{8}$ $0.70 < f_1/f_2 < 1.50$ $0.47 < d_1/f < 1.25$ wherein:

β represents the magnification of the whole lens system;
$d_1$ represents the axial thickness of the first lens element;
$f_1$ represents the focal length of the first lens element;
$f_2$ represents the focal length of the second lens element; and
f represents the focal length of the whole lens system.

2. An objective lens as claimed in claim 1, wherein the lens system further fulfills the following condition:

$-1.00 < (r_1+r_2)/(r_1-r_2) < 1.00$ wherein:

$r_1$ represents the paraxial radius of curvature of the light source side surface of the first lens element; and
$r_2$ represents the radius of curvature of the disk side surface of the first lens element.

3. An objective lens system as claimed in claim 2, wherein the lens system further fulfills the following conditions:

$0.2 < \phi_3 < 0.7$ $$0.6 < \phi_2 + \phi_3 < 1.0$$

$$|\phi_2 - \phi_3| < 0.6$$

provided by:

$$\phi_2 = (1 - N_1) \cdot f / r_2$$

$$\phi_3 = (N_2 - 1) \cdot f / r_3$$

wherein:
$N_1$ represents the refractive index of the first lens element;
$N_2$ represents the refractive index of the second lens element; and
$r_3$ represents the radius of curvature of the light source side surface of the second lens element.

4. An objective lens system for optical recording type disks, comprising from a light source side to a disk side;
a first lens element of a positive refractive power; and
a second lens element of a positive refractive power, wherein the disk side surface of the first lens element is aspherical while all of the other surfaces are spheric, and wherein the lens system fulfills the following conditions:

$$-\tfrac{1}{2} < \beta < -\tfrac{1}{8}$$

$$0.47 < d_1/f < 1.25$$

$$0 < d_2/d_1 < 0.85$$

wherein:
$\beta$ represents the magnification of the whole lens system;
$d_1$ represents the axial thickness of the first lens element;
$d_2$ represents the axial distance from the disk side surface of the first lens element to the light source side surface of the second lens element; and
$f$ represents the focal length of the whole lens system.

5. An objective lens system as claimed in claim 4, wherein the lens system further fulfills the following conditions:

$$0.80 < f \cdot (\phi_1 + \phi_4) < 1.30$$

$$0.10 < f \cdot \phi_4 < 0.80$$

provided by:

$$\phi_1 = (N_1 - 1)/r_1$$

$$\phi_4 = (1 - N_2)/r_4$$

wherein:
$N_1$ represents the refractive index of the first lens element;
$N_2$ represents the refractive index of the second lens element;
$r_1$ represents the radius of curvature of the light source side surface of the first lens element; and
$r_4$ represents the radius of curvature of the disk side surface of the second lens element.

* * * * *